(12) United States Patent
Nakaie

(10) Patent No.: US 7,232,014 B2
(45) Date of Patent: Jun. 19, 2007

(54) BRAKE CALIPER SUPPORT STRUCTURE FOR MOTORCYCLE

(75) Inventor: Hirokatsu Nakaie, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 10/958,451

(22) Filed: Oct. 6, 2004

(65) Prior Publication Data
US 2005/0139434 A1    Jun. 30, 2005

(30) Foreign Application Priority Data
Oct. 10, 2003    (JP) .............................. 2003-352964

(51) Int. Cl.
*F16D 55/00*    (2006.01)
*B62K 1/00*    (2006.01)
(52) U.S. Cl. .................... 188/71.1; 188/72.4; 188/328; 180/219; 280/281.1
(58) Field of Classification Search ............... 188/71.1, 188/72.1, 72.4, 72.5, 73.2, 26, 74, 328, 344; 303/137; 180/219, 226, 231; 280/281.1, 280/284, 288, 288.4
See application file for complete search history.

(56) References Cited

U.S. PATENT DOCUMENTS 6,450,301 B1 * 9/2002 Iizuka et al. .................. 188/26
6,588,529 B2 * 7/2003 Ishii et al. .................. 180/219
2005/0082100 A1 * 4/2005 Sakaki et al. ............... 180/219

FOREIGN PATENT DOCUMENTS

| JP | 9-2362 A | * | 1/1997 |
| JP | 11-115868 A | | 4/1999 |
| JP | 2001-97269 A | * | 4/2001 |

* cited by examiner

*Primary Examiner*—Pam Rodriguez
(74) *Attorney, Agent, or Firm*—Birch, Stewart, Kolasch & Birch, LLP

(57) ABSTRACT

In a motorcycle with a swing arm disposed on one side of a rear wheel for supporting the rear wheel. The swing arm is formed in a roughly triangular shape in a side view and a brake caliper of a rear brake is supported by the swing arm. The brake caliper is disposed relative to the rear brake so as to contrive a lowering of the center of gravity of the motorcycle and to enhance the rigidity of the swing arm. An opening portion is provided in a roughly central portion of a swing arm and a brake caliper is disposed in the opening portion.

20 Claims, 21 Drawing Sheets

BRAKE CALIPER SUPPORT STRUCTURE FOR MOTORCYCLE

CROSS-REFERENCE TO RELATED APPLICATIONS

The present non-provisional application claims priority under 35 USC 119 to Japanese Patent Application No. 2003-352964 filed on Oct. 10, 2003 the entire contents thereof is hereby incorporated by reference.

BACKGROUND OF THE INVENTION

1. Field of the Invention

The present invention relates to a brake caliper support structure for a motorcycle in which a swing arm is disposed on one side of a rear wheel for supporting the rear wheel with roughly a triangular shape in a side view and wherein a brake caliper of a rear brake is supported by the swing arm.

2. Description of Background Art

A brake caliper support structure for a motorcycle is known, for example, as set forth in Japanese Patent Laid-open No. Hei 11-115868.

In the conventional structure mentioned above, the brake caliper of the rear brake is supported by a support member attached to an upper portion of the swing arm. In order to contrive a lowering of the center of gravity of the motorcycle, it is desirable to dispose the brake caliper at a lower position and, simultaneously, to enhance the rigidity of the swing arm itself.

SUMMARY AND OBJECTS OF THE INVENTION

The present invention has been made in consideration of the above-mentioned circumstances. Accordingly it is an object of the present invention to provide a brake caliper support structure for a motorcycle in which a brake caliper of a rear brake is so disposed as to enhance the mount rigidity of the brake caliper while making it possible to contrive a lowering of the center of gravity of the motorcycle, to enhance the rigidity of the swing arm itself, and enhance appearance quality.

In order to attain the above object, the present invention provides a brake caliper support structure for a motorcycle including a swing arm disposed on one side of a rear wheel for supporting the rear wheel. The swing arm is roughly triangular in shape in a side view. A brake caliper of a rear brake is provided with the rear caliper being supported by the swing arm. An opening portion is provided in a roughly central portion of the swing arm with the brake caliper disposed in the opening portion.

In addition, the present invention provides an exhaust muffler that is disposed on the outer side of the swing arm so as to cover the brake caliper from the outer side.

The present invention provides an opening portion that is so formed that its vertical width decreases in a rearward direction with the brake caliper being disposed in a rear portion of the opening portion being supported by the swing arm on the rear side relative to the opening portion.

Furthermore, the present invention provides a lower portion of the exhaust muffler that is fastened to the swing arm at two positions on both the front and rear sides of an axle of the rear wheel. The axle and a fastening portion are provided for fastening to the swing arm, of a rear shock absorber provided between the swing arm and a vehicle body frame that are disposed between a straight line connecting between the fastening portions of the lower portion of the exhaust muffler and the exhaust muffler.

According to the present invention, it is possible to dispose the brake caliper at a lower position and to thereby contrive a lowering of the center of gravity of the motorcycle. In addition, since the surroundings of the brake caliper are surrounded by the swing arm, it is possible to secure a substantial width in the vertical direction of the swing arm in a side view, and to enhance the longitudinal and torsional rigidities.

In addition, according to the present invention, since the brake caliper is covered with the exhaust muffler from the outer side, the appearance quality can be enhanced.

According to the present invention, it is possible to support the brake caliper at a higher rigidity portion of the swing arm, and thereby to enhance the mount rigidity of the brake caliper.

Furthermore, according to the present invention, it is possible to facilitate the mounting of the exhaust muffler and the rear shock absorber onto the swing arm, to render the axle and the fastening portions difficult to see from the side and upper sides of the motorcycle, and to enhance the appearance quality.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Now, one mode of carrying out the present invention will be described below, based on one embodiment of the present invention shown in the accompanying drawings.

Figure 1:
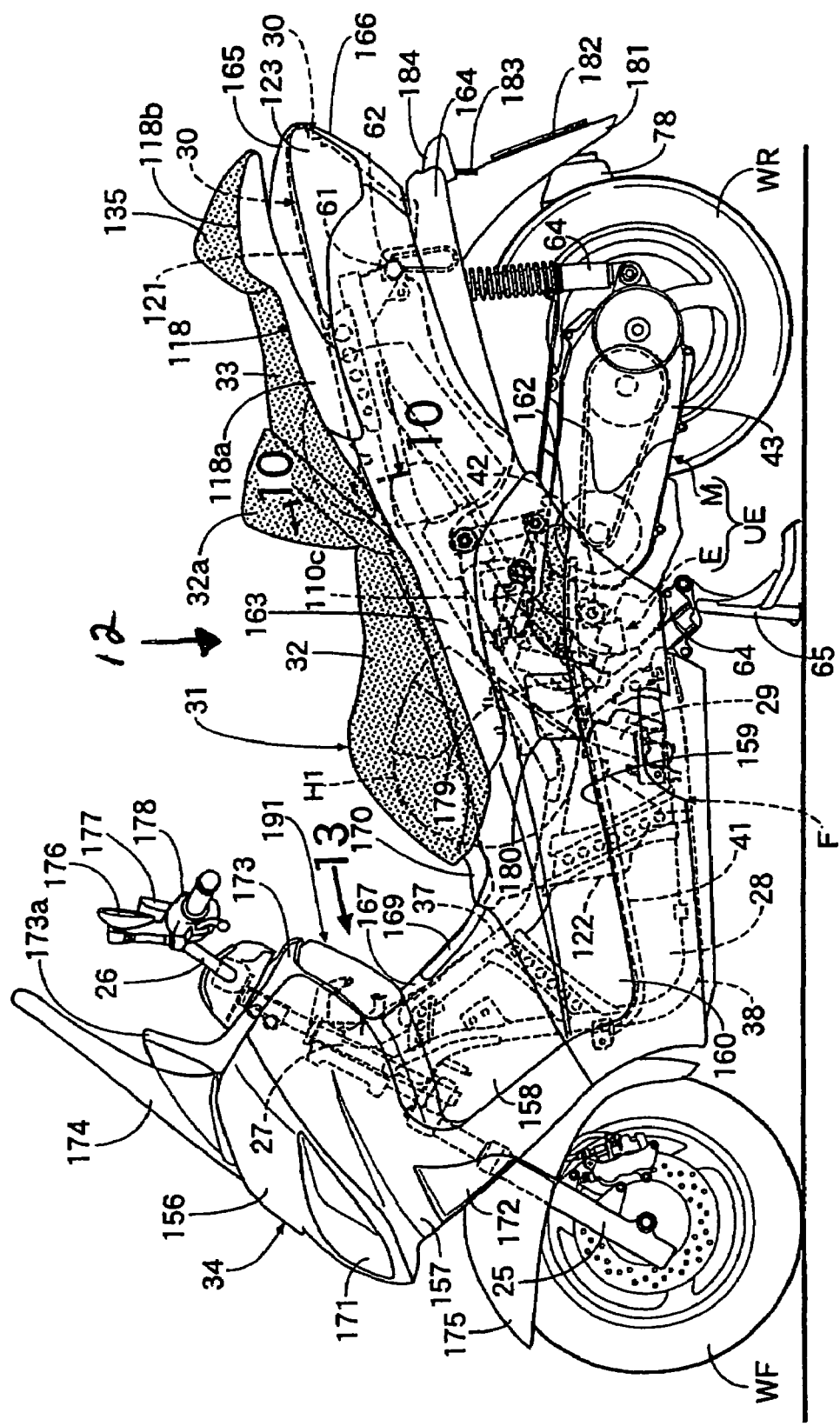
FIG. 1 is a left side view of a motor scooter type vehicle.

As illustrated in FIG. 1, a vehicle body frame F of a motor scooter type vehicle such as a motorcycle includes, at its front end, a front fork 25 for supporting a front wheel WF and a head pipe 27 for mounting a steering handle 26 connected to the front fork 25. A unit swing engine UE is provided for supporting a rear wheel WR at its rear end in a vertically swingably manner on an intermediate portion in the front-rear direction of a vehicle body frame F. A fuel tank 28 is formed to be elongated vertically in side view with a radiator 29 disposed on the rear side relative to the fuel tank 28 being mounted on the vehicle body frame F on the front side relative to the unit swing engine UE. In addition, a luggage box 30 is mounted to the vehicle body frame F so as to cover the unit swing engine UE from the upper side and a riders' seat 31 is formed in a tandem type having a front seat 32 and a rear seat 33 being disposed on the luggage box 30. Further, a synthetic resin-made vehicle body cover 34 is provided for covering the vehicle body frame F, a front portion of the unit swing engine UE, the fuel tank 28, the radiator 29 with the luggage box 30 is mounted to the vehicle body frame F.

Figure 2:
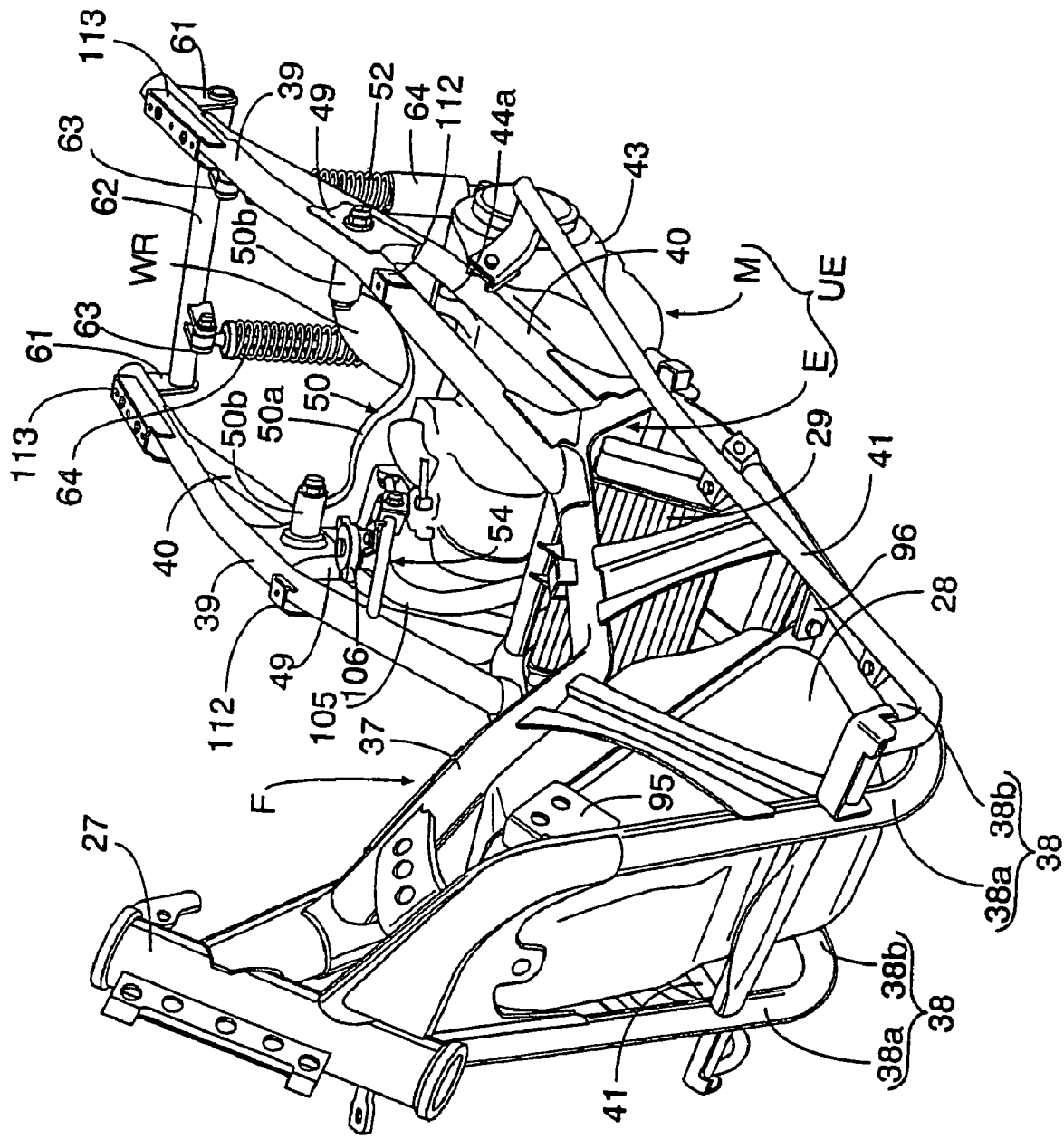
FIG. 2 is a perspective view of a vehicle frame in the condition where a fuel tank and a radiator are mounted.
Figure 3:
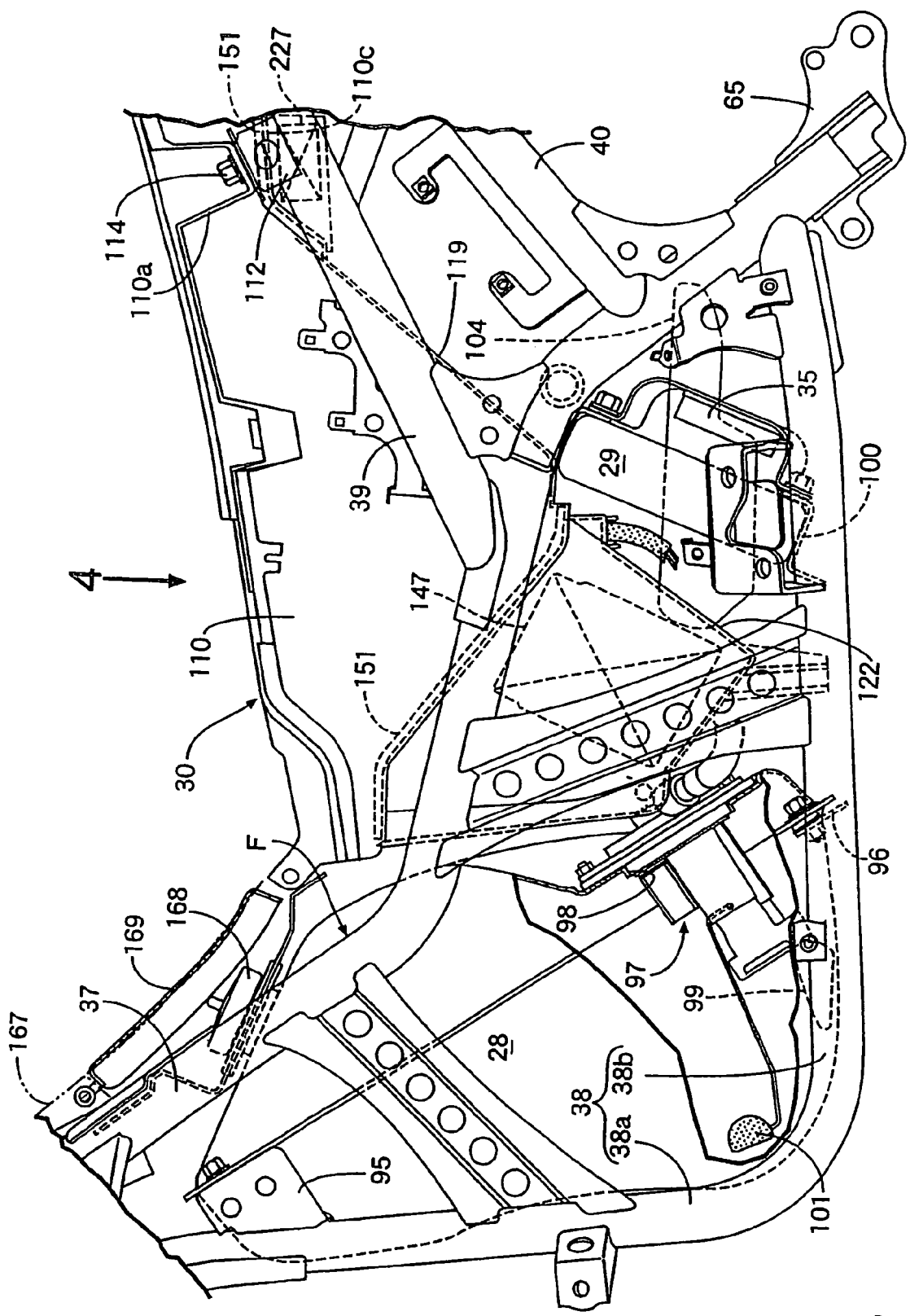
FIG. 3 is a left side view of an intermediate portion in the front-rear direction of the motor scooter type vehicle in the condition where a riders' seat and a vehicle body cover have been removed.

Referring to FIGS. 2 and 3, the vehicle body frame F includes the head pipe 27, a left-right pair of upper down frames 37 joined to the head pipe 27 and extended rearwardly and downwardly, a left-right pair of lower down frames 38, 38 which have horizontal portions 38b integrally joined to the rear ends of inclined portions 38a joined to the head pipe 27 on the lower side relative to the upper down frames 37 and extended rearwardly and downwardly and which have their rear ends welded to rear end portions of the upper down frames 37. A left-right pair of seat rails 39, 39 extended rearwardly and upwardly from intermediate portions of both the upper down frames 37 with a left-right pair of rear frames 40 being connection between rear portions of the upper down frames 37 and rear portions of the seat rails 39. A left-right pair of support frames 41, 41 are disposed on the outer sides of the upper down frames 37, the lower down frames 25 and the rear frames 40 and extend in the front-rear direction.

Both the support frames 41 support, from the lower side, step floors 159 formed in the vehicle body cover 34 on the left and right sides thereof with the front ends of both the support frames 41 being connected to lower portions of the inclined portions 38a of the lower down frames 38 and the rear ends of both the support frames 41 being connected to intermediate portions of the rear frames 40.

Figure 4:
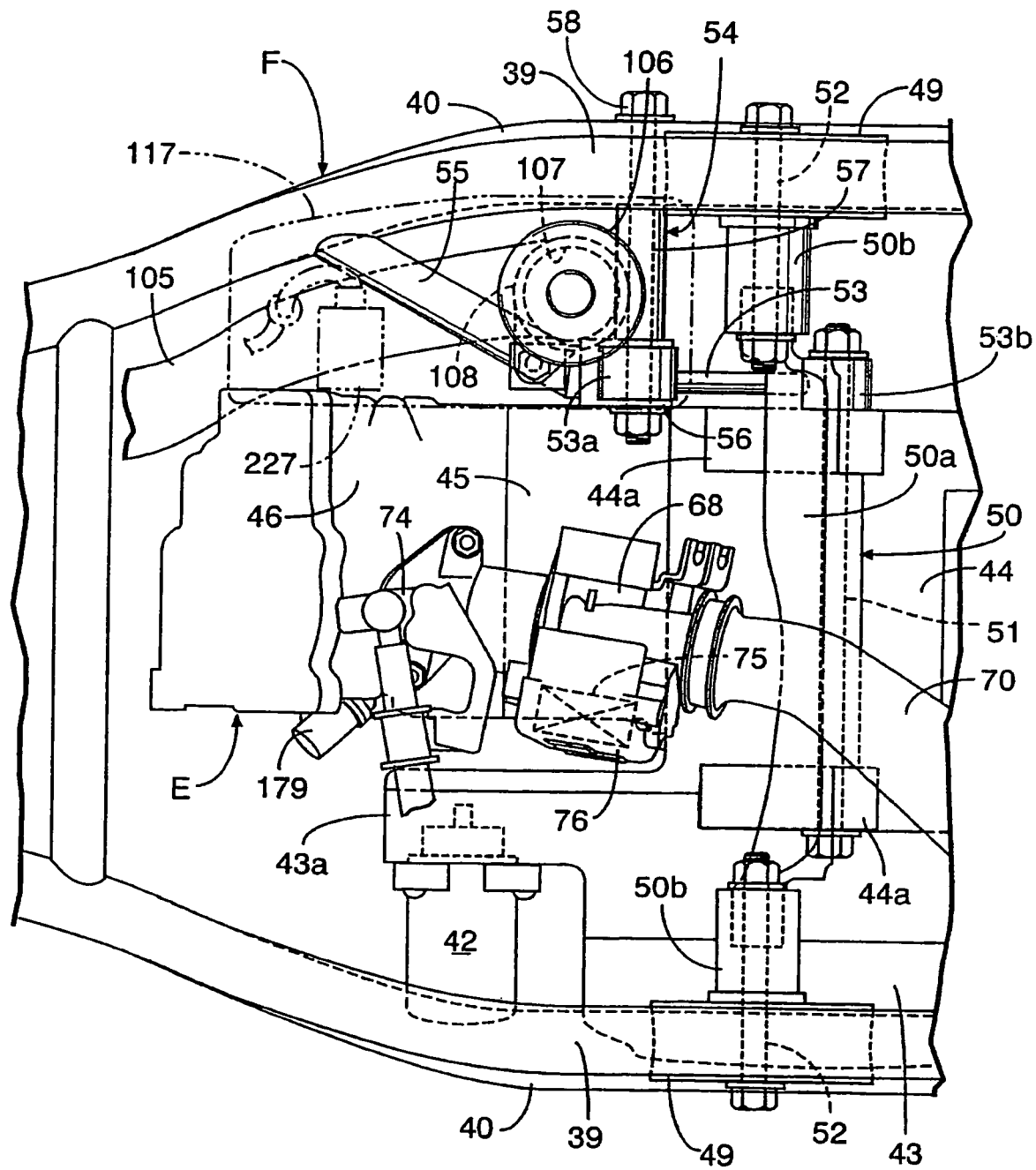
FIG. 4 is a view along arrow 4 of FIG. 3 in the condition where a luggage box has been removed.
Figure 5:
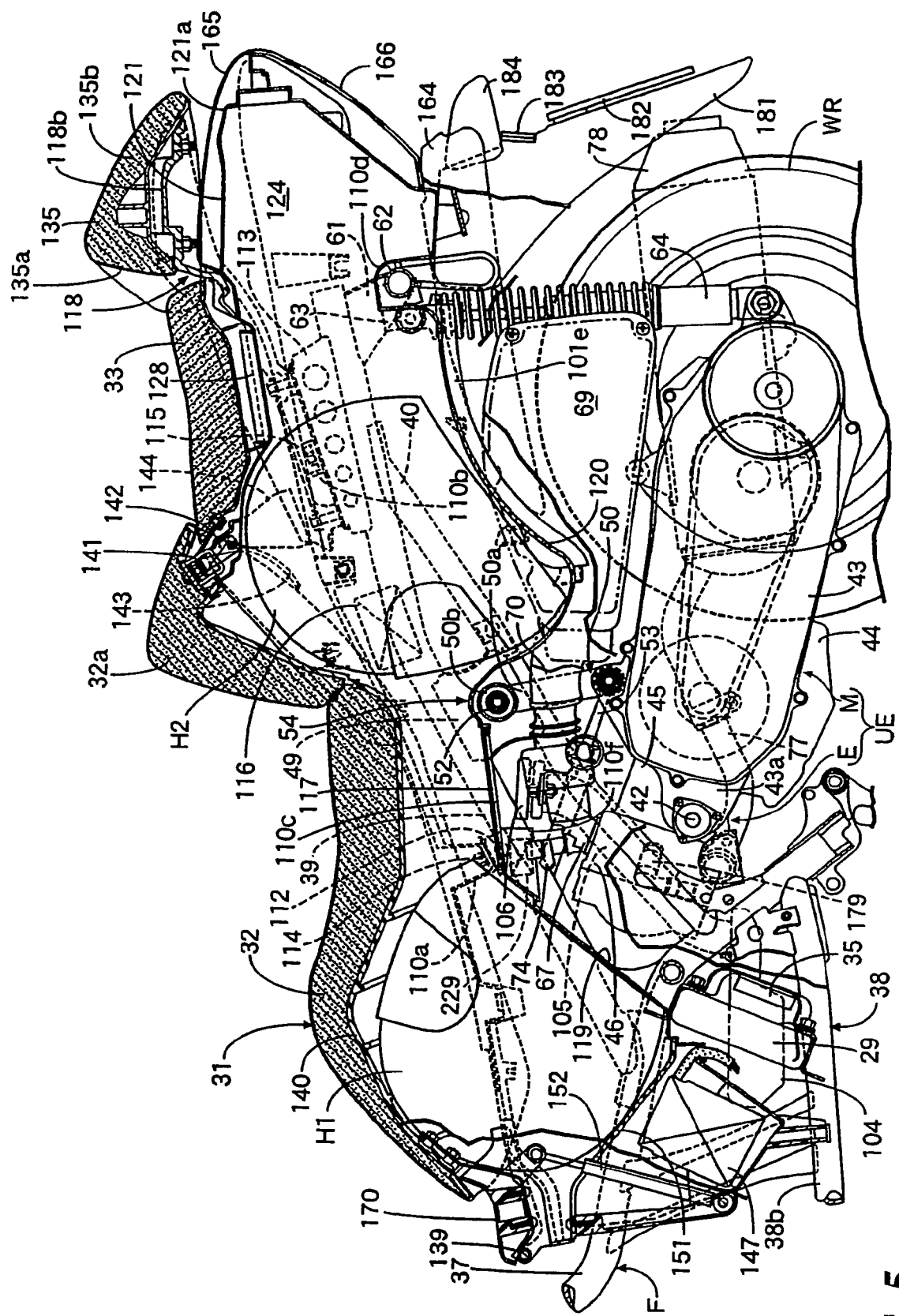
FIG. 5 is an enlarged vertical sectional side view of a rear portion of the motor scooter type vehicle.
Figure 6:
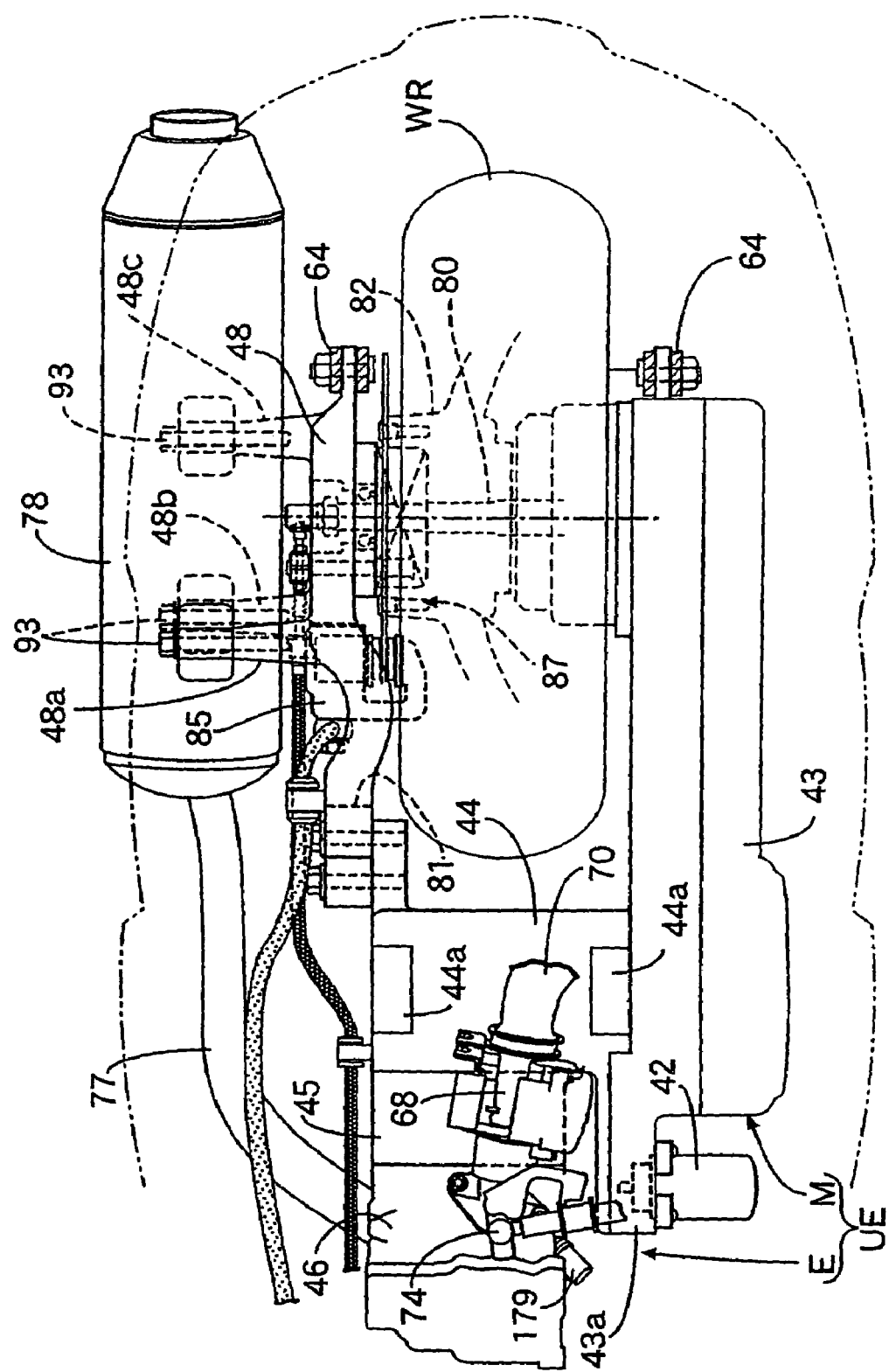
FIG. 6 is a view showing the relative arrangements of a unit swing engine and a rear wheel.

Referring to FIGS. 4 to 6, the unit swing engine UE is composed of a water-cooled type engine E with a cylinder axis set substantially horizontal and a belt-type non-stage transmission M for transmitting the output of the engine E to the rear wheel WR through non-stage speed change through a transmission belt and pulleys. The non-stage transmission M is for non-stage change of a speed change ratio by driving a movable pulley on the crankshaft side according to the operation of an electric motor 42 for speed change.

A transmission case 43 of the non-stage transmission M is in continuity with the left side of a crankcase 44 in the engine E so as to project to the left side from the engine E and extends to the left side of the rear wheel WR. In addition, a front end portion of the swing arm 48 is connected to the right side of the crankcase 44 and the rear wheel WR is shaft-supported between a rear end portion of the transmission case 43 and a rear end portion of the swing arm 48.

Meanwhile, the electric motor 42 for the speed change is disposed on the left side of a cylinder 45 in the engine E on the front side relative to the non-stage transmission M and is attached to a front projecting portion 43a of the transmission case 43, with its rotational axis directed in the vehicle width direction. Moreover, the electric motor 42 is disposed on the lower side relative to a left-side passenger step 162 of a left-right pair of passenger steps 162 possessed by the vehicle body cover 34 and is disposed so as to be located on the lower side, in a side view, of the left-side support frame 41 of both the support frames 41 constituting a part of the vehicle body frame F.

Brackets 49, 49 are provided between intermediate portions of the seat rails 39 and the rear frames 40 in the vehicle body frame F and a pair of support projecting portions 44a, 44a are provided on the upper surface of the crankcase 44 in the engine E. A link 50 includes a link tube portion 50a extending in the vehicle body width direction and hollow cylindrical support tube portions 50b, 50b formed coaxially and integrally with both ends of the link tube portion 50a. Both the support projecting portions 44a, 44a and the link tube portion 50a are connected by a connection shaft 51, which is a bolt. In addition the support tube portions 50b, 50b at both ends of the link 50 are turnably borne on the brackets 49, 49 through support shafts 52, 52 parallel to the connection shaft 51. Namely, the unit swing engine UE is borne on the vehicle body frame F so as to be turnable about the axis of both the support shafts 52, 52.

A tension rod 53 is provided between the engine E and the vehicle body frame F with ring-form connection portions 53a, 53b being provided at both ends of the tension rod 53. The connection portion 53a on one end of the tension rod 53 is turnably connected to a mount portion 54 provided in the right-side seat rail 39 and the rear frame 40 of the vehicle body frame F. The connection portion 53b on the other end of the tension rod 53 is turnably connected to the right end of the connection shaft 51 for connecting the crankcase 44 to the link 50.

The mount portion 54 includes a support tube 55 extending rearwardly and downwardly from a front portion of the left-side seat rail 39 to a skew rear side. A bracket 56 is attached to the rear end of the support tube 55 in a roughly U-shape opened to the rear side. A connection tube 57 is provided for connection between the right-side rear frame 40 and the bracket 56. The connection portion 53a at one end of the tension rod 53 is turnably borne on the mount portion 54 by a bolt 58 fixed to the vehicle body frame F so as to be passed through the bracket 56 and the connection tube 57.

In addition, support plates 61, 61 projecting downwardly are attached to the rear ends of both the seat rails 39 of the vehicle body frame F with upper end portions of rear shock absorbers 64, 64 being connected to a pair of brackets 63, 63 provided on a support pipe 62 bridgingly disposed between both the support plates 61, 61. A lower end portion of the transmission case 43 is connected to a rear end portion of the swing arm 48.

Brackets 65 are attached to the rear ends, or the lower ends, of both the upper down frames 37 with a main stand 66 being turnably supported by both the brackets 65. When the main stand 66 is erected, the motor scooter type vehicle can be made to stand by itself with the rear wheel WR off the ground, as shown in FIG. 1. At the time of operation of the motor scooter type vehicle, the main stand 66 may be stored so that the rear wheel WR is grounded.

The downstream end of a throttle body 68 is connected to the upper surface of the cylinder head 46 of the engine E through an intake pipe 67 curved toward the rear side from the cylinder head 46 with the upstream end of the throttle body 68 being connected to an air cleaner 69 disposed on the upper side of the non-stage transmission M in the unit swing engine UE through a connection pipe 70 passed on the upper side of the link tube portion 50*a* of the link 50.

A fuel injection valve 74 is attached to the intake pipe 67. In addition, a control box 76 with a controller 75 positioned therein for controlling the ignition timing of the engine E and the fuel injection amount of the fuel injection valve 74 is attached to the throttle body 68.

Figure 7:
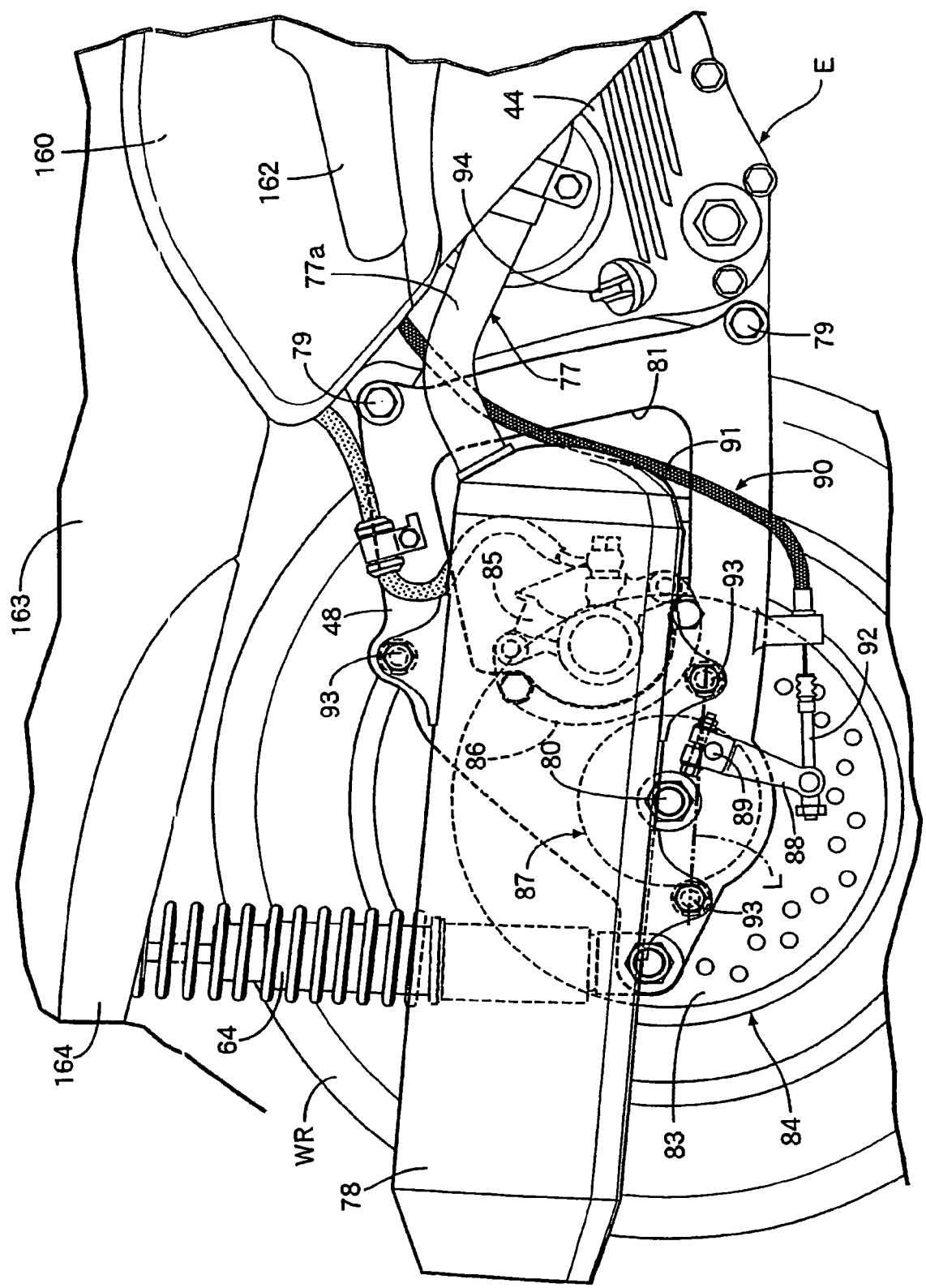
FIG. 7 is a right side view of a rear portion of the motor scooter type vehicle.

An exhaust pipe 77 is connected to the lower surface of the cylinder head 46 with the exhaust pipe 77 being connected to an exhaust muffler 78 disposed on the right side of the swing arm 48, as shown in FIG. 7.

The swing arm 48 is formed so as to be roughly triangular in shape, with its rear end narrowed, in side view. Upper and lower portions of a front portion of the swing arm 48 are fastened to the crankcase 44 of the engine E by bolts 79, 79 with an axle 80 of the rear wheel WR being borne on a rear portion of the swing arm 48 and the lower end of the rear shock absorber 64 being connected to the rear end of the swing arm 48 on the rear side relative to the axle 80.

An opening portion 81 is provided in a roughly central portion of the swing arm 48 with a brake caliper 85 of a rear brake 84 which is a disk brake including a brake disk 83 attached to a hub 82 of the rear wheel WR being disposed in the opening portion 81. A caliper bracket 86 is attached to the swing arm 48 and the brake caliper 85 is fixed to the caliper bracket 86.

Moreover, the opening portion 81 is so formed that its vertical width decreases in a rearward direction and the brake caliper 85 disposed at a rear portion of the opening 81 is fixed to the caliper bracket 86 attached to the swing arm 48 on the rear side of the opening portion 81.

In addition, a drum brake 87 for the parking brake is attached to the hub 82 of the rear wheel WR, a lever 88 for a brake operation of the drum brake 87 is disposed on the outside of the swing arm 48 and a turning shaft 89 to which the base end of the lever 88 is attached is turnably passed through the swing arm 48 and projects into the drum brake 87. On the other hand, an end portion of an outer cable 91 possessed by a brake cable 90 is supported on a lower portion of the swing arm 48 and an end portion of an inner cable 92 protruding from an end portion of the outer cable 91 is connected to a tip end portion of the lever 88.

Three support bosses 48*a*, 48*b*, 48*c* are integrally projecting from the swing arm 48 so as to project to the outside. The exhaust muffler 78 fastened to the support bosses 48*a* to 48*c* by bolts 93 is disposed on the outside of the swing arm 48 so as to cover, from the outside, the brake caliper 85 disposed in the opening portion 81. Moreover, the brake caliper 85 is disposed between the support bosses 48*a* and 48*b* of the support bosses 48*a* to 48*c*, and the brake caliper 85 can be protected by the support bosses 48*a*, 48*b*.

In addition, lower portions of the exhaust muffler 78 are disposed on the lower side relative to the exhaust muffler 78, of the support bosses 48*a* to 48*c*, and on both the front and rear sides of the axle 80 of the rear wheel WR. Namely, the lower portions of the exhaust muffler 78 are fastened to the swing arm 48 at two locations on both the front and rear side of the axle 80. The axle 80 and a fastening portion, for fastening to the swing arm 48, of the rear shock absorber 64 are disposed between a straight line L for connection between the fastening portions of the exhaust muffler 78 and the exhaust muffler 78.

A level gage 94 is disposed at a lower portion of the crankcase 44 for detecting the oil level in the crankcase 44 of the engine E is disposed in the vicinity of a connection portion of the connection pipe 77 for connection to the exhaust muffler 78. The exhaust pipe 77 is provided, in the vicinity of the connection portion for connection to the exhaust muffler 78, with a curved portion 77*a* curved to project to the upper side so as to obviate interference with the level gage 94.

The fuel injection valve 74 for injecting fuel toward the engine E is supplied with the fuel from the fuel tank 28. The fuel tank 28 is disposed in a space which is surrounded by the left-right pair of upper down frames 37 and the left-right pair of lower down frame 38 of the vehicle body frame F and which is located immediately on the rear side of the front wheel WF. The fuel tank 28 is formed so as to vertical extend from the rear side of a lower portion of the head pipe 27 to lower portions of both the lower down frames 38.

Mounting plates 95 for fastening an upper portion of the fuel tank 28 are welded to the inclined portions 38*a* of both the lower down frames 38. Mounting plates 96 for fastening a lower portion of the fuel tank 28 are welded to the horizontal portions 38*b* of both the lower down frames 38.

A pump unit 97 is contained in a lower portion of the inside of the fuel tank 28 with the pump unit 97 being attached to the fuel tank 28 from the back side of the fuel tank 28 in a manner so that it is inserted into the fuel tank 28 via a mount hole 98 provided in a back surface of a lower portion of the fuel tank 28.

Moreover, the pump unit 97 is attached to the fuel tank 28 with its rotational axis inclined forwardly and downwardly. A fuel filter 99 is annexed to the pump unit 97 so as to suck the fuel in the fuel tank 28. The fuel filter 99 is disposed at a lowermost portion on the inside of the fuel tank 28. In addition, a float 101 which is moved vertically according to the quantity of fuel in the fuel tank 28 extends from the pump unit 97. The residual fuel amount detected by the float 101 is transmitted to the controller 75 in the control box 76 attached to the throttle body 68.

The radiator 29 equipped with a radiator fan 35 is disposed at a position spaced rearwardly from the fuel tank 28. The radiator 29 is supported by a support frame 100 provided between rear portions of the horizontal portions 38*b* of both the lower down frames 38 in the vehicle body frame F and lower portions of both the upper down frames 37 in the vehicle body frame F.

A reservoir tank 104 in connection with the radiator 29 is disposed on the lower side of a right-side step floor 159 of a left-right pair of step floors 159 possessed by the vehicle body cover 34. A hose 105 is provided in connection with the reservoir tank 104 that extends upwardly. The upper end of the hose 105 is connected to a water supply port forming member 108 forming a water supply port 107 openable and closable with a cap 106.

The water supply port forming member 108 is supported on the mount portion 54, for mounting onto the vehicle body frame F side, of the tension rod 53 provided between the vehicle body frame F and the unit swing engine UE swingably borne on the vehicle body frame F. In other words, the water supply port forming member 108 is borne on the support tube 55 which extends rearwardly and downwardly from a front portion of the right-side seat rail 39 toward a skew rear side and which constitutes a part of the mount portion 54.

Figure 8:
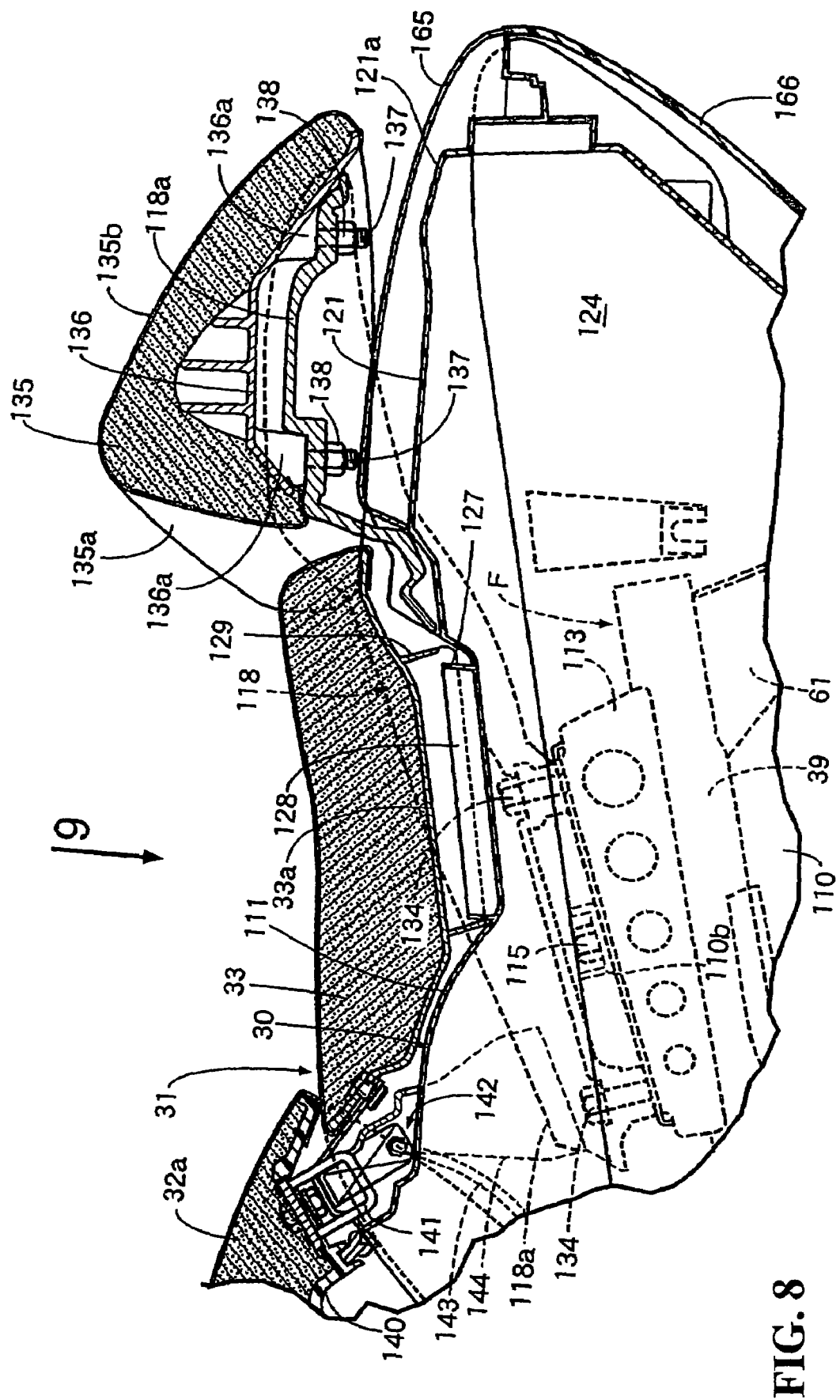
FIG. 8 is a vertical sectional view of the vicinity of a rear portion of the luggage box.
Figure 9:
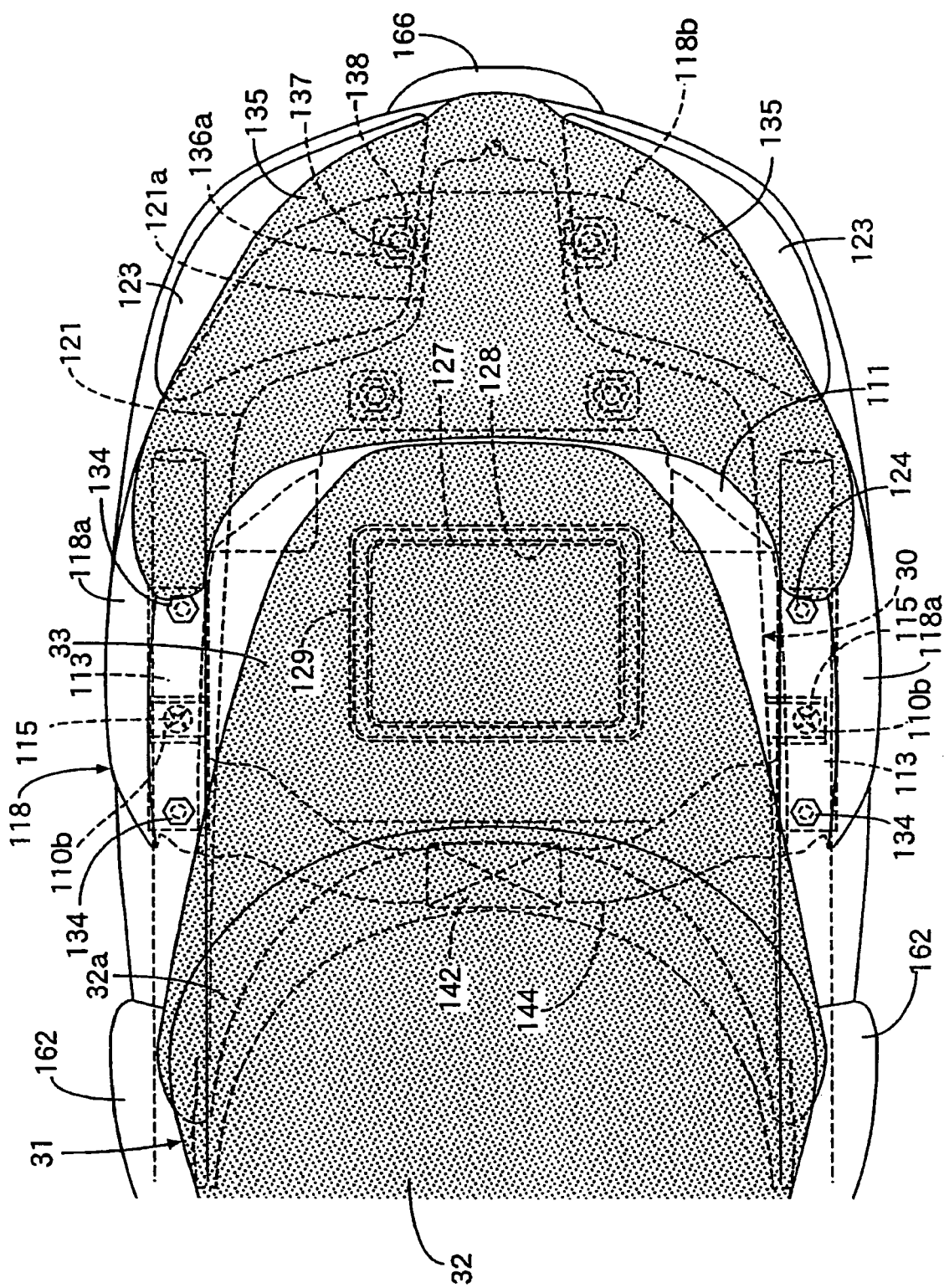
FIG. 9 is a view along arrow 9 of FIG. 8.

Referring to FIGS. 8 and 9, the luggage box 30 is disposed between rear portions of both upper down frames 37 of the vehicle body frame F, both the seat rails 39 and both the rear frames 40. The luggage box 30 is composed of a box main body 110 opened at the top end thereof and a top cover 111 connected to the box main body 110 so as to cover a rear portion of the box main body 110 from the upper side and is disposed on the lower side of the riders' seat 31 so as to extend from the lower side of the front end of the riders' seat 31 to the vicinity of upper portions of the rear shock absorbers 64.

In order to support the luggage box 30 on the vehicle body frame F, front support members 112 are welded respectively to intermediate portions of the pair of seat rails 39 in the vehicle body frame F. Rear support members 113 that are elongate in the front-rear direction are welded respectively to rear portions of both the seat rails 39. On the other hand, front mount portions 110a mounted on the front support members 112 and rear mount portions 110b mounted on intermediate portions in the longitudinal direction of the rear support members 113 are provided on both side upper portions of the box main body 110 of the luggage box 30. The front mount portions 110a are fastened, respectively, to the front support members 112 by bolts 114. The rear mount portions 110b are fastened, respectively, to the rear support members 113 by bolts 115.

The bottom wall of the luggage box 30, i.e., the bottom wall of the box main body 110 is provided with a front helmet containing portion disposed on the lower side of the front seat 32 so as to be capable of containing a helmet H1 therein. A rear helmet containing portion 120 is disposed on the lower side of the rear seat 33 so as to be capable of containing a helmet H2 therein. A substantially flat shallow bottom portion 110c is disposed between the front helmet containing portion 119 and the rear helmet containing portion 120. Moreover, the front edge of the top cover 111 of the luggage box 30 is formed in an arcuate shape projecting to the rear side in a side view, for enabling the helmet H2 to be contained in the rear helmet containing portion 120. In addition, an illuminating tool 116 is provided for illuminating the inside of the luggage box 30. The illuminating tool is attached to an inside surface of the box main body 110 at a portion corresponding to a front portion of the top cover 111.

The throttle body 68 and the fuel injection valve 74 are disposed on the lower side of the shallow bottom portion 110c of the luggage box 30, with their upper end positions being substantially the same. The water supply port 107 of the reservoir tank 104 is disposed on the lower side of the shallow bottom portion 110c. A first maintenance lid 117 is openably and closably attached to the shallow bottom portion 110c on the upper side of the water supply port 107.

The support pipe 62 is provided as a mount portion for mounting upper portions of the rear shock absorbers 64 to rear portions of the vehicle body frame F and a rear projecting portion 121. The rear projecting portion 121 projects rearwardly beyond the rear end of the rear seat 33 and is provided at rear portions of the luggage box 30. The rear projecting portion 121 projects rearwardly to substantially the same position as the rear end of a grab rail 118 disposed around the rear seat 33. Moreover, a reduced width portion 121a coming between the left and right tail light units 123, 123 in a top plan view is provided at the center of a rear portion of the rear projecting portion 121.

A lower portion of the rear projecting portion 121 is disposed on the lower side relative to the support pipe 62, which is the mount portion for mounting upper portions of the rear shock absorbers 64 to rear portions of the vehicle body frame F. As a result, a raised portion 110d corresponding to the mount portion for mounting an upper portion of the rear shock absorber 64 to the vehicle body frame F is formed by partially raising the bottom wall of the luggage box 30, namely, the box main body 110. An article containing portion 124 is located so as to have the raised portion 110d between itself and the rear helmet containing portion 120 formed in the rear projecting portion 121.

The rear seat 33 of the riders' seat 31 is formed so as to cover the front portion side of the top cover 111 of the luggage box 30. The front edge of the rear seat 33 is formed in an arcuate shape projecting to the rear side in a top plan view, correspondingly to the front end of the top cover 111.

Figure 10:
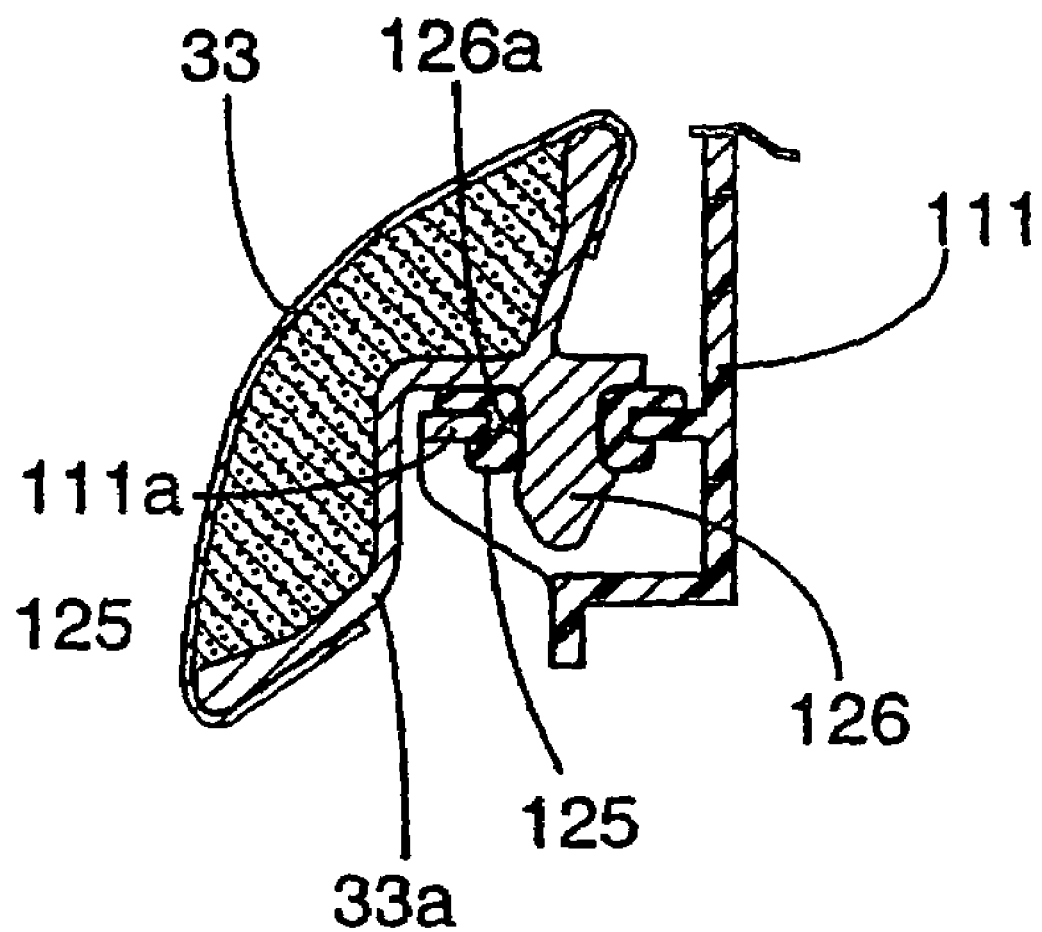
FIG. 10 is an enlarged sectional view along line 10—10 of FIG. 1.

In FIG. 10, the rear seat 33 is detachably attached to the top cover 111 of the luggage box 30. Receiving plate portions 11a project sideways and are integrally provided on both sides of a front portion of the top cover 111. Elastic rings 125 are formed of an elastic material and are mounted respectively to the receiving plate portions 11a. On the other hand, fitting projections 126 are provided at the outer circumference thereof with annular recessed portions 126a for elastic engagement with the elastic rings 125 and are integrally projecting on a bottom plate 33a of the rear seat 33. By the elastic engagement between the fitting projections 126 with the elastic rings 125 through the annular recessed portions 126a, the rear seat 33 is detachably attached to the top cover 111.

A first rib 127 is formed in an endlessly continuous tetragonal shape and projects on the upper surface of the top cover 111. As a result, a containing space 128 that is usable according to the attachment and detachment of the rear seat 33 is formed on the upper surface of the top cover 111 in a manner so as to be surrounded by the first rib 127. In addition, a second rib 129 is endlessly continuous while the surrounding first rib 127 extends down from the bottom plate 33a of the rear seat 33. The first and second ribs 127 and 129 constitute a labyrinth structure surrounding the containing space 128.

The grab rail 118 is made of metal and integrally includes grip portions 118a, 118a disposed on both sides of the rear seat 33 and extends in the front-rear direction. A connection portion 118b is provided for connecting between the rear ends of the grip portions 118a. Front portions of both the grip portions 118a are fastened, respectively, to the rear support members 113 welded to rear portions of the seat rails 39 of the vehicle body frame F, by bolts 134 at two locations on the front and rear side of the fastening portions for fastening the luggage box 30 to the rear support members 113.

The connection portion 118b is disposed at a position spaced upwardly from an upper portion of the rear projecting portion 121 of the luggage box 30, and is integrally connected to the rear ends of both the grip portions 118a so as to be at substantially the same height as the upper surface of the rear seat 33. A back rest 135 for holding, from the back side, a waist portion of a passenger seated on the rear seat 33 is detachably attached to the connection portion 118b.

More specifically, a plurality of leg portions 136a that make contact with the connection portion 118b of the grab rail 118 integrally project on a bottom plate 136 of the back rest 135. In addition, bolts 137 passed through the connection portion 118b of the grab rail 118 are planted in the leg portions 136a. By positioning nuts 138 to be engaged with the lower surface of the connection portion 118b into screw engagement with the bolts 137 and fastening the nuts 138, the back rest 135 is detachably attached to the upper surface of a rear portion of the grab rail 118, i.e., the upper surface of the connection portion 118b.

In addition, the back rest 135 is formed in a roughly streamline shape having a front inclined portion 135a inclined forwardly and downwardly in a side view and a rear inclined portion 135b inclined rearwardly and downwardly in a side view, and is so formed that its width gradually decreases in the rearward direction in a top plan view. The grab rail 118 and the back rest 135 overlap each other over substantially the whole part thereof in top plan view.

The front seat 32 of the riders' seat 31 is integrally provided, at its rear portion, with a back rest portion 32a raised upwardly so as to hold, from the rear side, a waist portion of the driver seated on the front seat 32, and is disposed on the luggage box 30 so as to cover, from the upper portion, a front opening portion that is not covered with the top cover 111, of the luggage box 30. A front end portion of the front seat 32 is connected to the front end of the luggage box 30 through a hinge pin 139. Thus, a front end portion of the front seat 32 is borne on the luggage box 30 so as to be vertically openable and closable.

A roughly U-shaped striker 141 is attached to a rear portion of the bottom plate 140 of the front seat 32. A seat catcher 142 is provided that is capable of a changeover between a seat catch condition for gripping the striker 141 so as to hold the front seat 32 in a closed state. A seat catch release condition is provided for releasing the grip on the striker 141 so as to enable the opening and closing operations of the front seat 32. The seat catch release is disposed between front portions of the front and rear seats 32, 33 of the top cover 111 of the luggage box 30 at a position corresponding to a central portion in the width direction of the rear seat 33. When the front seat 32 is in an open condition and is lowered to close the front opening portion of the luggage box 30, the seat catcher 142 is engaged with the striker 141, resulting in the seat catch condition. On the other hand, by pulling on a power transmission cable 143, the seat catcher 142 is changed over from the seat catch condition into the seat catch release condition.

The seat catcher 142 is provided at a metallic bridging plate 144 provided between the front ends of both the grip portions 118a of the grab rail 118. The bridging plate 144 is formed so as to come from the front ends of both the grip portions 118a to the position between the top cover 111 and the rear seat 33 and to extend along the upper surface of a front portion of the top cover 111.

In addition, a cover 146 is provided with a cutout 145 (see FIG. 12) for removable insertion of the striker 141 that is attached to a front portion of the center in the width direction of the rear seat 33, so as to cover the seat catcher 142 from the upper side in the condition where the front seat 32 is opened.

Figure 11:
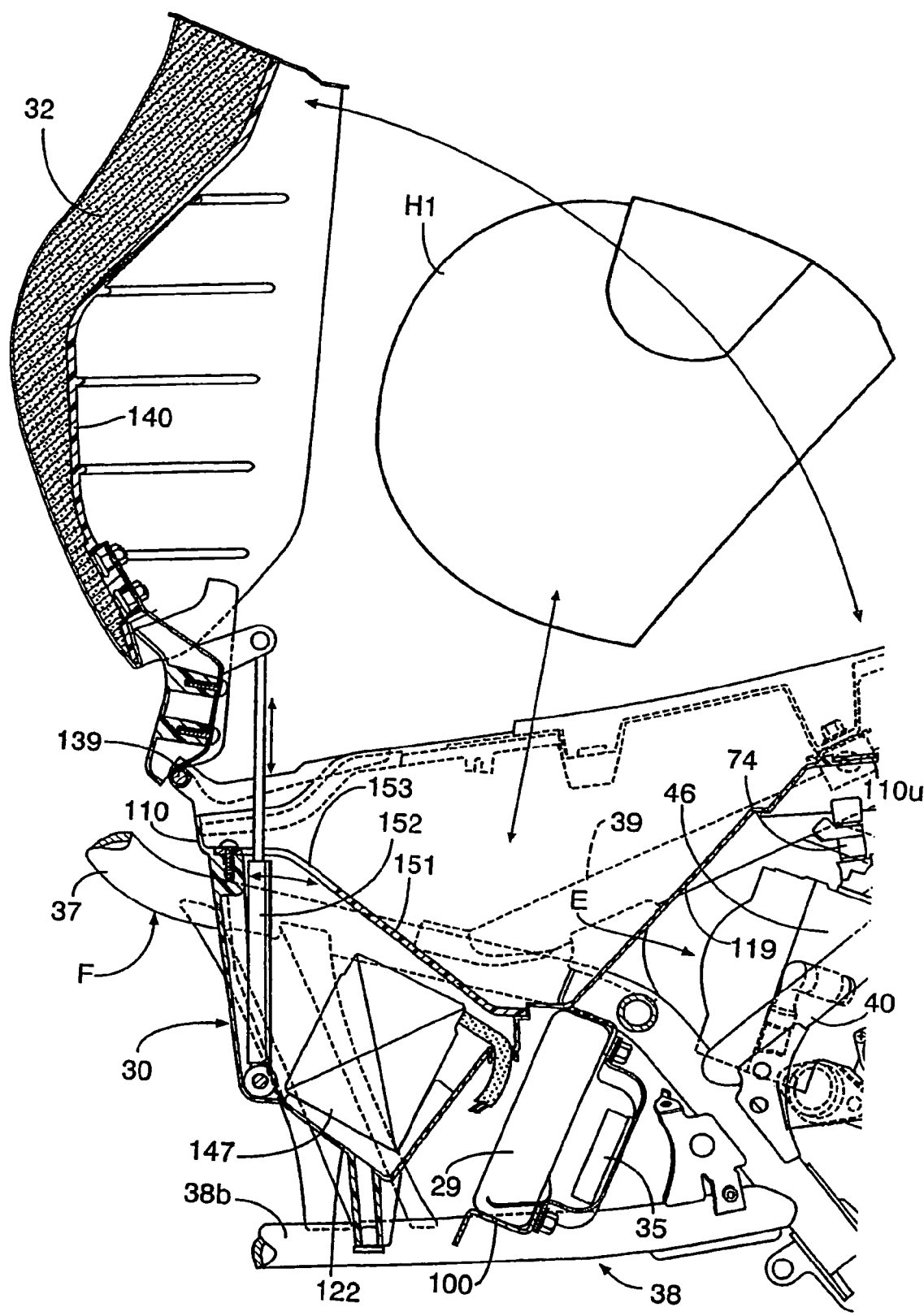
FIG. 11 is an enlarged view of an essential part of FIG. 5 in the condition where a front seat is opened.
Figure 12:
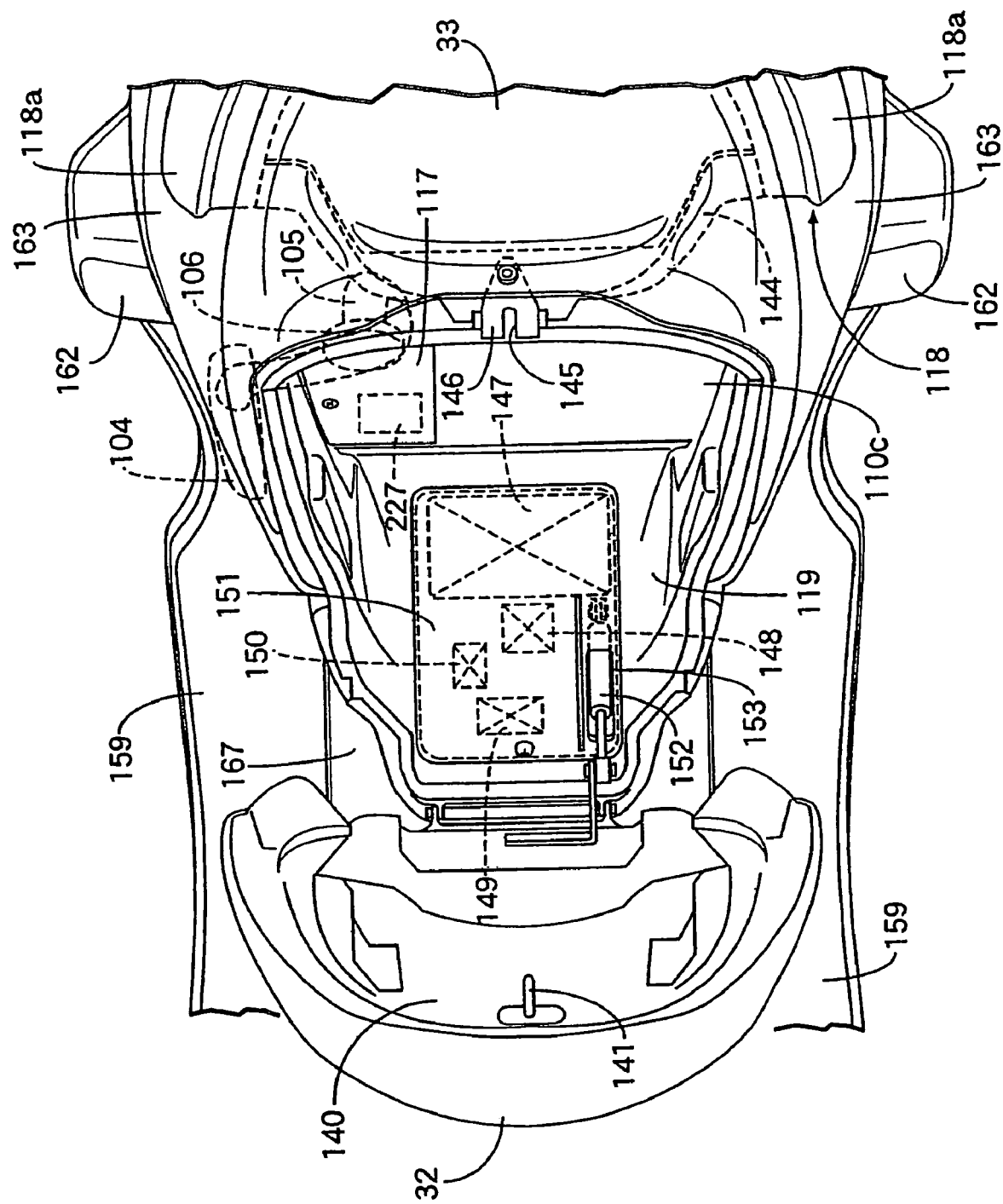
FIG. 12 is a view along arrow 12 of FIG. 1.
Figure 13:
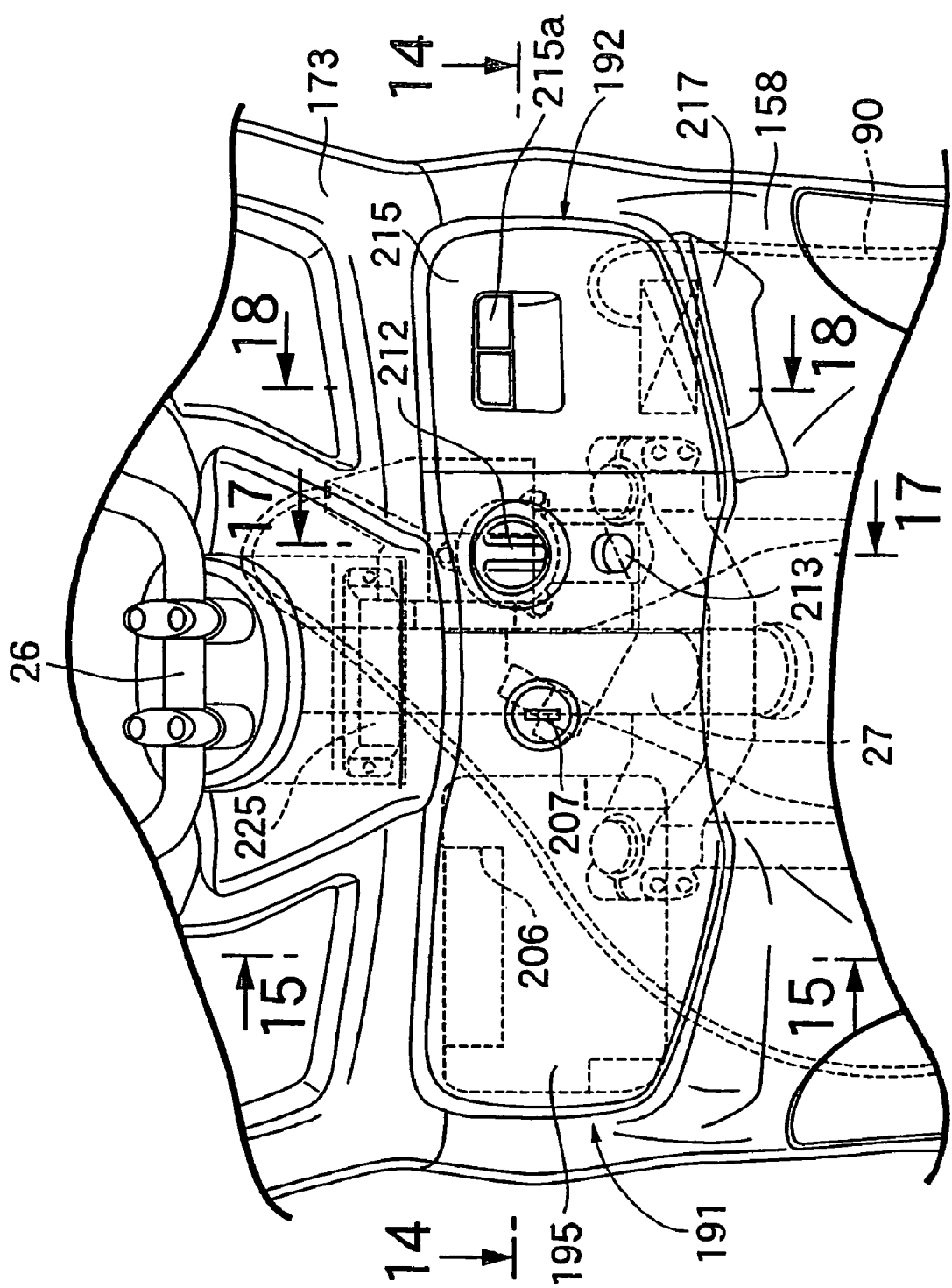
FIG. 13 is an enlarged view along arrow 13 of FIG. 1.
Figure 14:
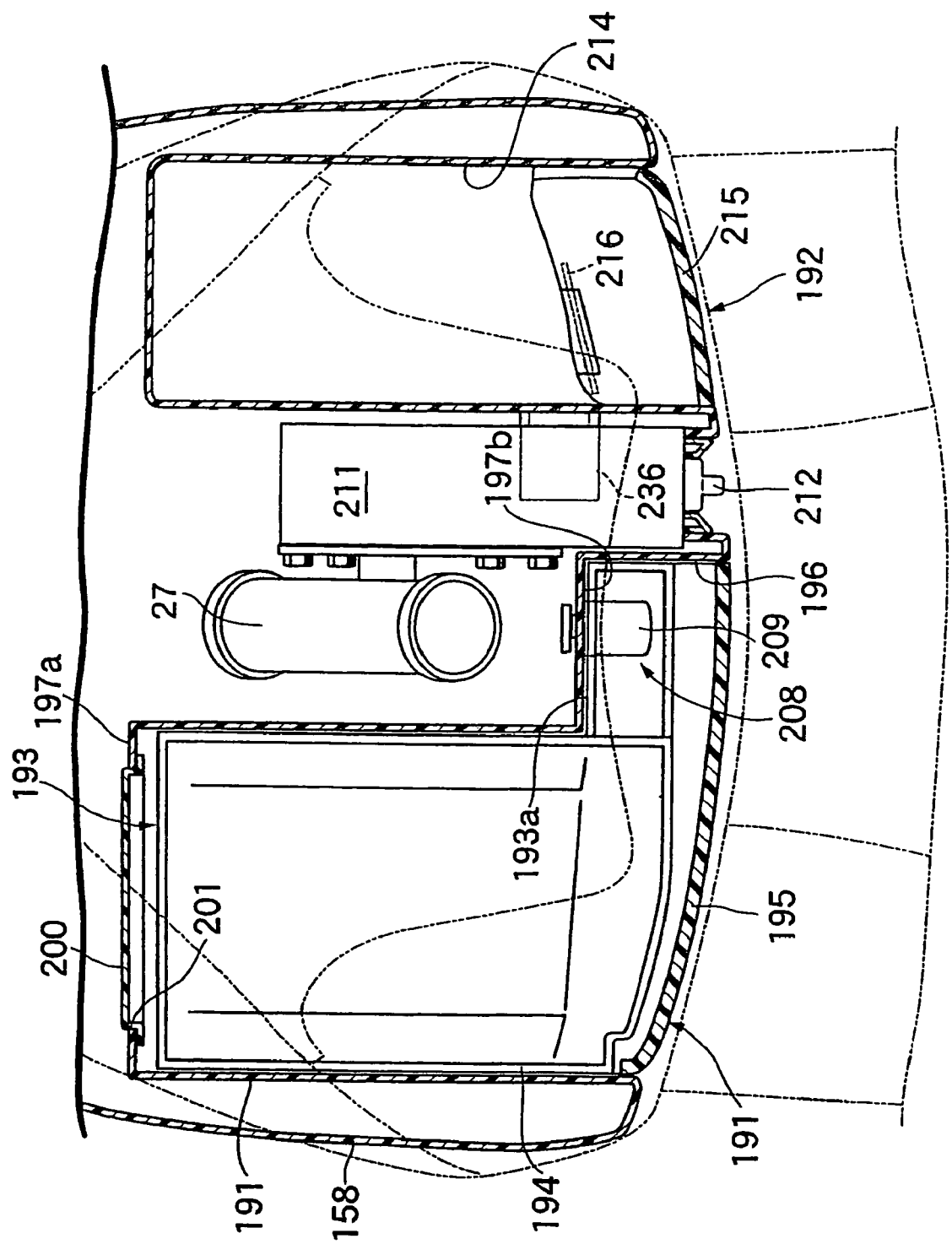
FIG. 14 is a general sectional view along line 14—14 of FIG. 13.
Figure 15:
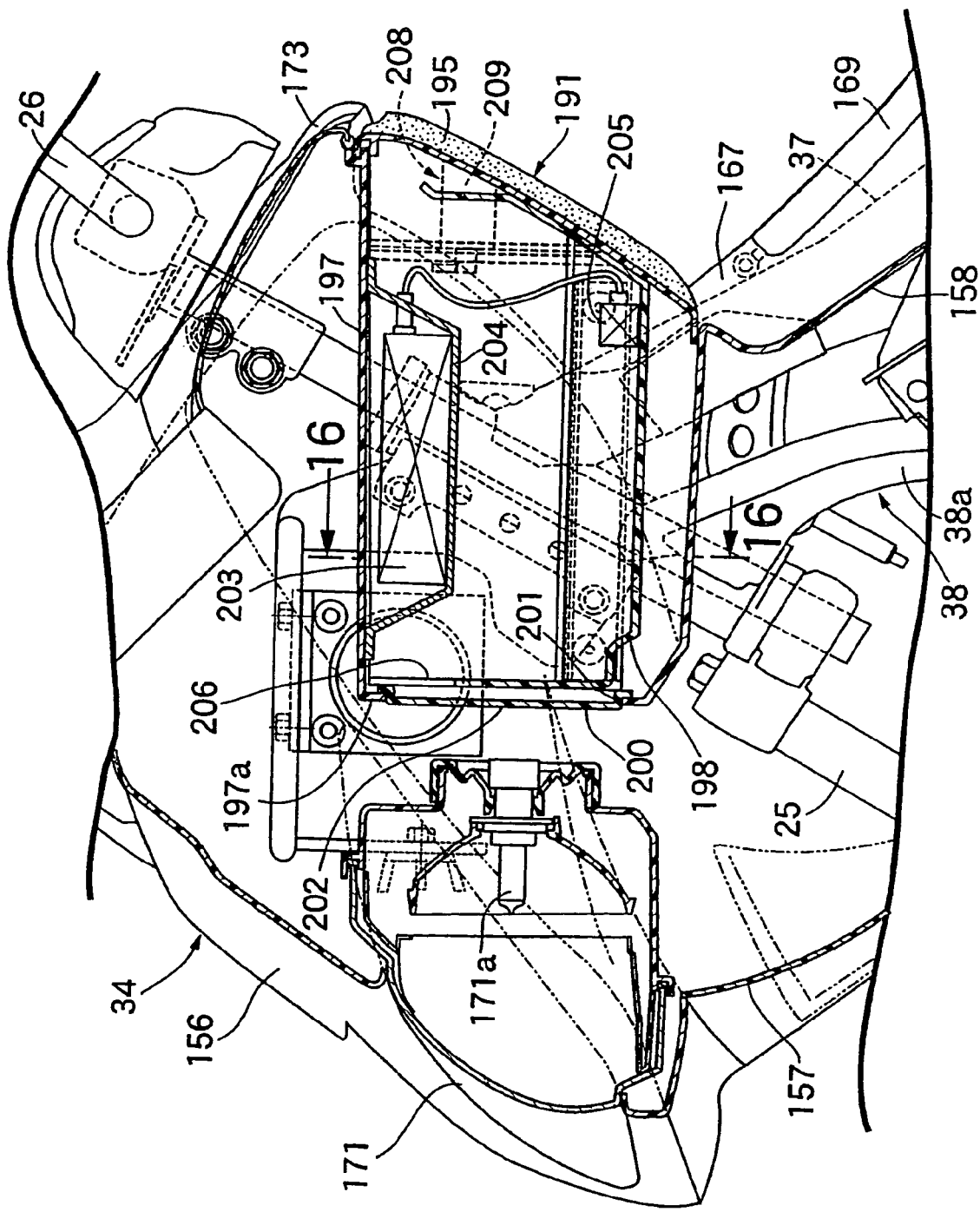
FIG. 15 is a sectional view along line 15—15 of FIG. 13.
Figure 16:
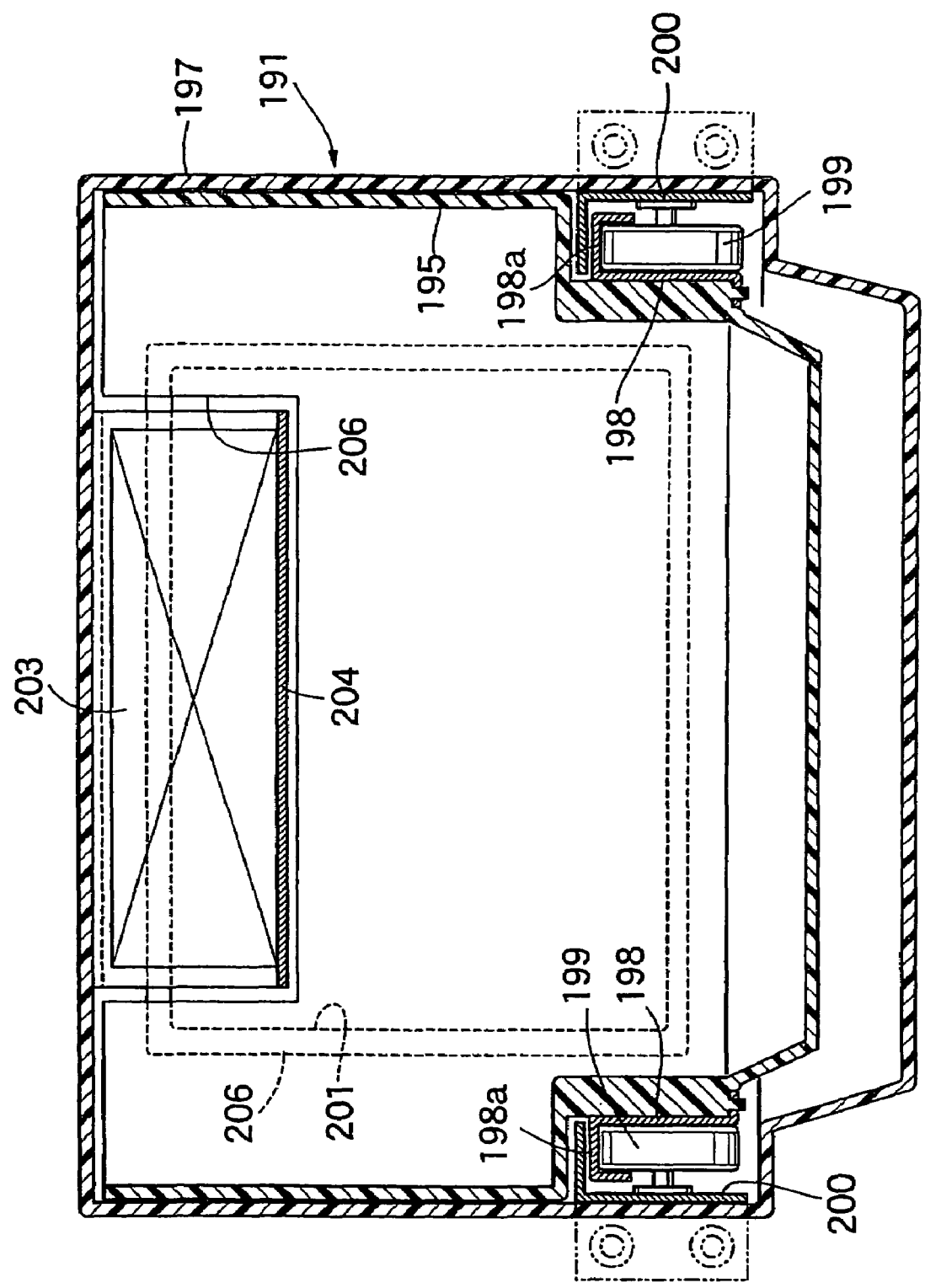
FIG. 16 is a sectional view along line 16—16 of FIG. 15.

Referring to FIGS. 11 and 12, the fuel tank 28 is disposed on the front side of the luggage box 30. A front projecting portion 122 projects in a forward direction to the vicinity of a bottom portion of the fuel tank 28 and is provided at a lower portion of the front end of the luggage box 30 so as to be located between the fuel tank 28 and the radiator 29. A battery 147 for providing an electrical source is contained in the front projecting portion 122. The battery 147 is disposed between the fuel tank 28 and the radiator 29.

The electrical equipments 148, 149, 150 and the like are contained in the front projecting portion 122, in addition to the battery 147.

A second maintenance lid 151 is provided for partitioning the front projecting portion 122 and the front helmet containing portion 119 from each other and is openably and closably attached to the bottom wall of the box main body 110 of the luggage box 30. By opening the second maintenance lid 151 in the condition where the front seat 32 is opened, it is possible to perform maintenance on the battery 147 and the electrical equipments 148 to 150 in the front projecting portion 122.

In addition, a damper rod 152 is provided for assisting in the opening and closing operations of the front seat 32 by enabling the front seat 32 to be opened with a light force and by moderating the closing speed at the time of closing the front seat 32. The damper rod 152 is provided between a front portion of the front seat 32 and a front portion of the luggage box 30. A lower portion of the damper rod 152 is contained in the front projecting portion 122, and the second maintenance lid 151 is provided with a slit 153 for insertion of the damper rod 152 therethrough so as to permit displacements of the damper rod 152 attendant on the opening and closing of the front seat 32.

As illustrated in FIG. 1, the vehicle body cover 34 includes a front cover 156 for covering a front portion of the head pipe 27 and an upper portion of the front wheel WF. A left-right pair of front side covers 157 are joined to both the left and right sides of the front cover 156. A leg shield 158 is joined to both the front side covers 157 so as to cover the front side of leg portions of the rider seated on the front seat 32 and to cover the head pipe 27 from the rear side. A left-right pair of floor center covers 160 extend rearwardly in continuity with the leg shield 158 and form step floors 159 at lower end portions thereof. A left-right pair of floor side covers 161 project downwardly, respectively, from outer edges of the step floors 159. A left-right passenger's steps 162 is provided, respectively, at rear portions of the step floors 159 with a left-right pair of body side covers 163 being disposed on the lower side on both sides of the rider's seat 31 and extending rearwardly in connection with the floor side covers 161. A left-right pair of rear floor covers 164 are provided in continuity with rear lower portions of the body side covers 163 with a rear upper cover 165 being disposed between the rear projecting portion 121 of the luggage box 30 and the grab rail 118. A rear center cover 166 is disposed between the left-right pair of tail light units 123 and is in continuity with the rear upper cover 165 in a manner for covering the small width portion 121a of the rear projecting portion 121 of the luggage box 30.

By a part of the leg shield 158 and the left-right pair of the floor center cover 160, a floor tunnel portion 167 is raised upwardly between both the step floors 159 and is formed to be disposed in the area ranging from the rear side of the head pipe 27 to the lower side of the front end of the riders' seat 31 and to be located on the upper side of the fuel tank 28 and the radiator 29. A fuel feed lid 169 is provided for enabling the fuel to be fed into the fuel tank 28 by opening a fuel feed cap 168 positioned on the fuel tank 28 at its top end that is openably and closably attached to the floor tunnel portion 167. A hinge cover 170 is provided for covering a hinge portion of the luggage box 30 of the front seat 32 that is joined to the rear end of the floor tunnel portion 167.

Head lights 171 are disposed respectively between both sides of a front portion of the front cover 156 and front portions of the left-right pair of front side covers 157 with winkers 172 being disposed respectively on the lower side of the head lights 171 and at front portions of both the front side covers 157. In addition, a panel 173 is provided for arranging the meters that is joined to upper portions of the front cover 156, both of the front side covers 157 and the leg shield 158. The panel 173 is integrally provided at its front portion with a meter visor 173a so as to be raised upwardly. Further, a windshield 174 is disposed on the front side of the meter visor 173a.

A front fender 175 is provided for covering the front wheel WF from the upper side and is supported on the front fork 25. A left-right pair of rearview mirrors 176 and an audio operation switch case 177 are provided. A switch case 178 is provided for operating lights and the like, etc. that are attached to the steering handle 26.

A plug maintenance lid 180, for performing maintenance on a spark plug 179 of the engine E, is openably and closably attached to the left-side floor center cover 160 of the left-right pair of floor center covers 160, at a position on the front side of the passenger step 162.

A license plate 182, a reflector 183 and a license light 184 are attached to a rear fender 181 for covering the rear wheel WR from the rear side. The rear fender 181 is attached to the rear projecting portion 121 of the luggage box 30, together with the left-right pair of tail light units 123. The rear upper cover 165 and the rear center cover 166 are cover members constituting a part of the vehicle body cover 34.

As shown in FIG. 5, a pair of ribs 110e that function as a rear fender project on the lower surface of the box main body 110 of the luggage box 30 on the front side of the rear fender 181, so as to be disposed on both the left and right sides of the rear wheel WR.

In FIGS. 13 to 16, first and second article containing portions 191, 192 are disposed in the leg shield 158 in the state of being divided to left and right portions. The first article containing portion 191 is configured as a drawer type having a containing case 193 that can be taken out by drawing out of the leg shield 158.

The containing case 193 has a structure in which a decorative cover 195 is attached to the outer end of a case main body 194 formed from, for example, synthetic resin in a rectangular box-like shape that is opened at an upper portion thereof. In addition, the leg shield 158 is provided with a rectangular opening portion 196 for insertion and removal of the containing case 193 and is integrally provided with a storage wall 197 formed in a rectangular tubular shape in continuity with the opening portion 196. The inner end of the storage wall 197 is closed with an end wall 197a.

Movable rails 198, 198 extend in the front-rear direction and are fixed, respectively, to lower portions on both sides of the case main body 194. Support portions 198a, 198a are formed in a roughly U-shape that is opened to the lower side and are formed integrally with the upper ends of the movable rails 198. The fixed rails 200, 200 extend in the front-rear direction and correspond to the movable rails 198 and are fixed to both inside surfaces of the storage wall 197. Rollers 199, 199 for mounting the support portions 198a of the movable rails 198 thereon are shaft-supported, respectively, at a plurality of locations, for example, two locations spaced in the longitudinal direction of the fixed rails 200. This ensures that the containing case 193 is inserted via the opening portion 196 into the storage wall 197 in such a manner that the containing case 193 can be slid between a storage position where the decorative cover 195 of the containing case 193 is in continuity with and substantially flush with the back surface of the leg shield 158 and a drawn-out position where the containing case 193 is mostly drawn out of the storage wall 197. In addition, it is also possible to draw the entire part of the containing case 193 out of the leg shield 158. Moreover, the containing case 193 is formed so as to cover the head pipe 27 from the left side when in the storage position.

The end wall 197a of the storage wall 197 is provided with a maintenance window 201 for enabling a maintenance operation such as the replacement of a bulb 171a of the head light 171 located on the front side of the end wall 197a when the containing case 193 has been drawn out of the leg shield 158. The window 201 is covered with a detachable lid 202.

In addition, a support frame 204 for mounting an audio amplifier 203 is attached to the upper surface of the storage wall 197, and a connector 205 in continuity with the amplifier 203 can be connected to a portable sound source such as an MP3, CD, MD player, etc. contained in the containing case 193. Moreover, the case main body 194 of the containing case 193 is provided at its inner end with a cutout 206 corresponding to the support frame 204, for obviating the interference of the support frame 204 with the containing case 193 when the containing case 193 is slid between the storage position and the drawn-out position.

In addition, the amplifier 203 may be fixedly disposed in the containing case 193. In this case, the support frame 204 is unnecessary, so that it is unnecessary to provide the case main body 194 with the cutout 206 at the inner end.

A projecting portion 193a projects inwardly in the vehicle body width direction and is provided on the outer end side of the containing case 193. The storage wall 197 is provided with a recessed portion 197b for containing the projecting portion 193a when the containing case 193 is stored in the storage position, in such a manner that the recessed portion 197b is opposed to the head pipe 27 from the rear side of the latter.

A locking mechanism 208 that is capable of a changeover between the connection of the containing case 193 to the leg shield 158 and a release of the connection according to key operations via a key hole 207 fronting on the front surface of the containing case 193 is provided between the containing case 193 and the leg shield 158. The locking mechanism 208 is provided at the projecting portion 193a of the containing case 193 so that a cylinder lock 209 operated by a key operation via the key hole 207 changes over between an engagement (connection) with the recessed portion 197b of the storage wall 197 and a release of the engagement. The locking mechanism 208 is disposed at a position opposed to the head pipe 27 from the rear side of the latter.

A hand lock module 211 is capable of disenabling the steering operation of the steering handle 26 and is disposed in the vicinity of the head pipe 27 on the opposite side of the first article containing portion 191. A second article containing portion 192 is disposed so as to locate the handle lock module 211 between itself and the first article containing portion 191.

Figure 17:
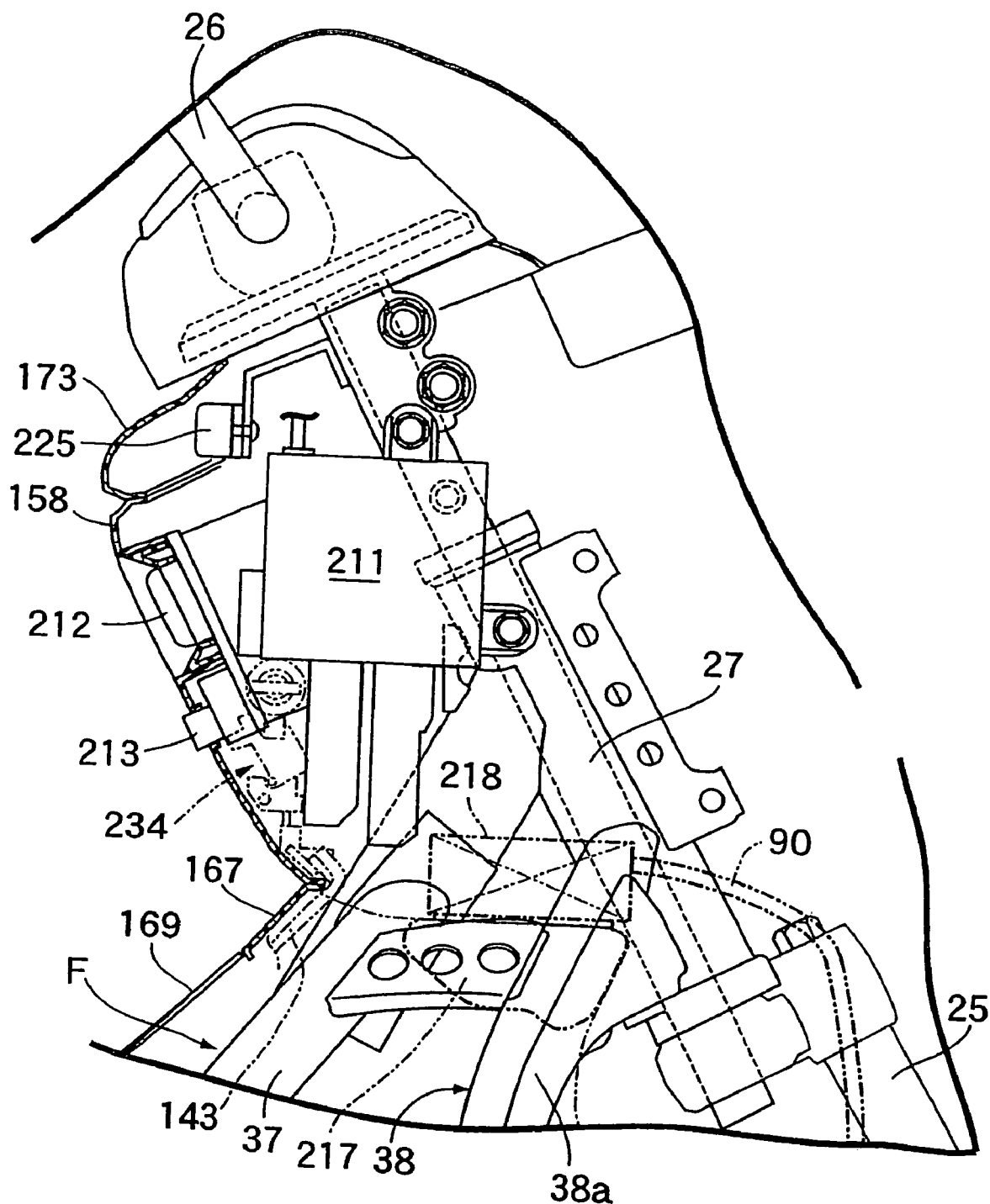
FIG. 17 is a sectional view along line 17—17 of FIG. 13.

As illustrated in FIG. 17, the handle lock module 211 enables the steering operation of the steering handle 26 and the starting of the engine E according to a knob 212 fronting on the back surface of the leg shield 158 between the first and second article containing portions 191 and 192 and is operated under predetermined conditions. A seat unlocking switch 213 for enabling an opening operation of the front seat 32 of the riders' seat 31 by an operation under predetermined conditions is disposed on a lower side of the handle lock module 211 and on the back side of the leg shield 158.

Figure 18:
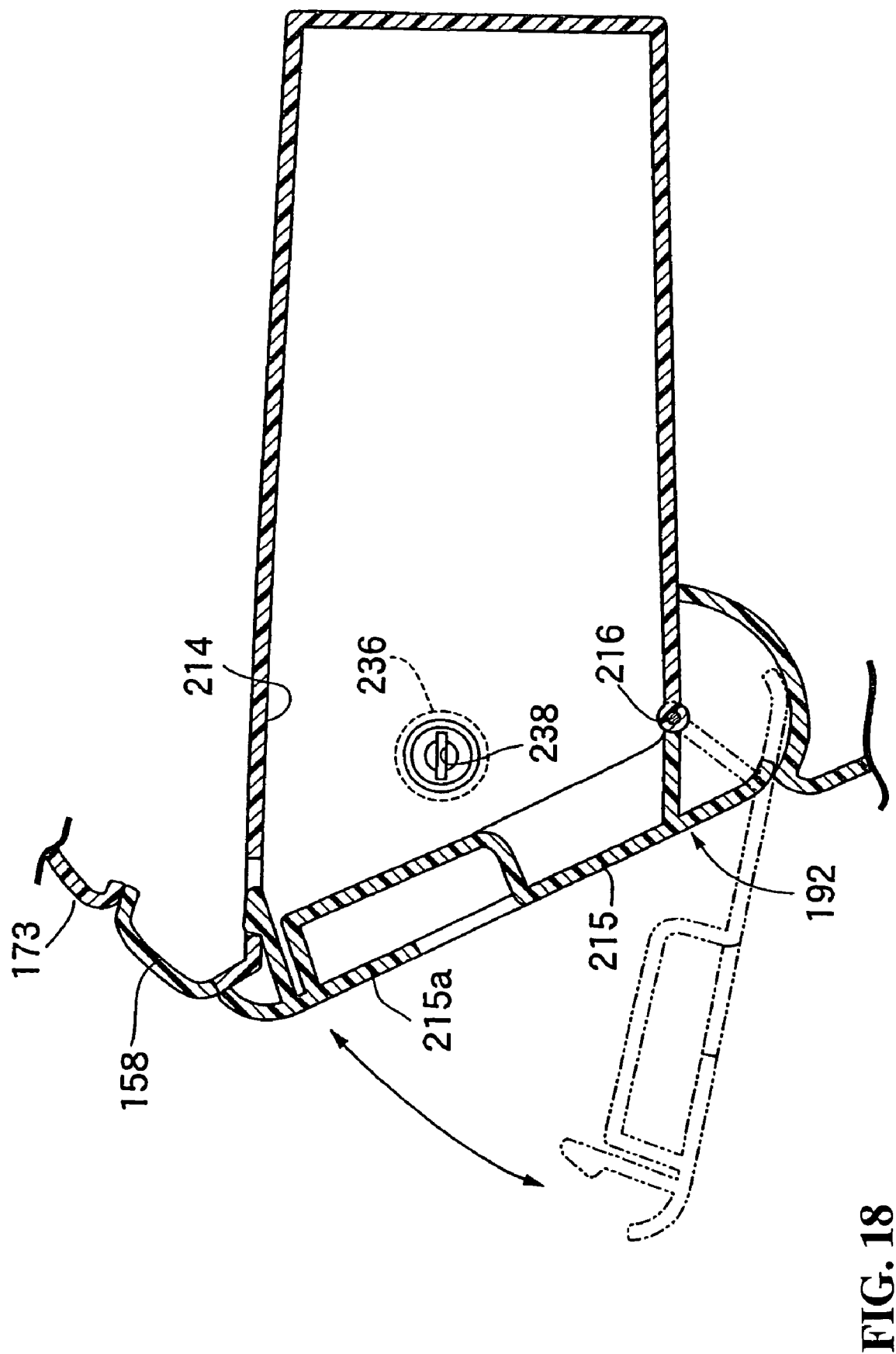
FIG. 18 is a sectional view along line 18—18 of FIG. 13.

As illustrated in FIG. 18, the second article containing portion 192 has a structure in which a containing recessed portion 214 formed in the leg shield 158 is openably and closably covered with a lid member 215 hinged to the leg shield 158. The containing recessed portion 214 is formed so as to be smaller than the containing case 193 of the first article containing portion 191 and to be slightly narrowed as one goes toward the front end.

The lid member 215 is hinged to the leg shield 158 through a pivot shaft 216 so that it can be turned between an open position where it is turned downwardly to open the containing recessed portion 214 as indicated by the broken line in FIG. 18 and to a closed position where it closes the containing recessed portion 214 as indicated by a solid line in FIG. 18. The lid member 215 is integrally provided with a handle portion 215a for enabling turning operations.

In addition, a parking brake lever 217 for operating the brake cable 90 connected to the drum brake 87 is shaft-supported on the leg shield 158 on the lower side of the lid member 215 so as to be capable of turning operations. The brake cable 90 extends from a parking brake mechanism 218 operated according to the operation of the parking brake lever 217.

Figure 19:
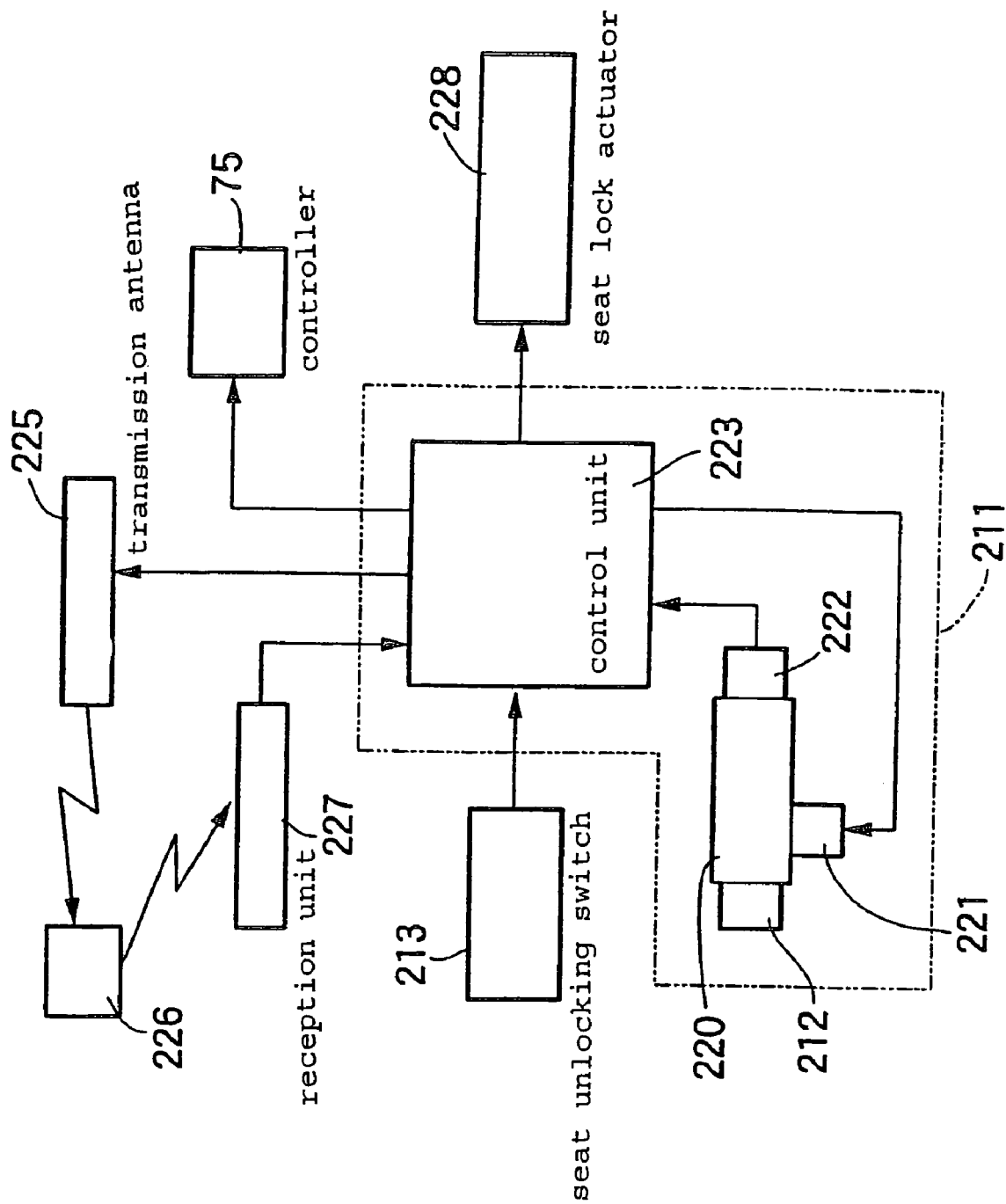
FIG. 19 is a diagram showing the configuration of a smart entry system.

In FIG. 19, the controller 75 is contained in the control box 76 attached to the throttle body 68. The handle lock module 211 and the seat unlocking switch 213 constitute a part of a smart entry system. The handle lock module 211 includes a cylinder lock 220 which can be turned by a knob 212 for unlocking the steering handle 26 from the head pipe 27 when turned. A lock solenoid 221 is capable of disenabling the turning of the cylinder lock 220. A main switch 222 is provided for performing a switching operation according to the turning of the cylinder lock 220. A control unit 223 is provided for receiving a signal from the main switch 222. The lock solenoid 221 is controlled by the control unit 223.

The control unit 223 is for controlling a transmission antenna 225 so as to transmit a signal for prompting the transmission of an ID signal from a normal portable transmitter 226 carried by the vehicle user. The result of the signal reception at a reception unit 227 for receiving the signal from the portable transmitter 226 is inputted to the control unit 223. When it is confirmed that the ID signal transmitted from the portable transmitter 226 is a predetermined signal, the control unit 223 operates the lock solenoid 221 so as to permit a turning operation of the cylinder lock 220 by use of the knob 212.

In addition, when it is confirmed that the ID signal transmitted from the portable transmitter 226 is a predetermined signal, the control unit 223 operates a seat lock actuator 228 according to the operation of the seat unlocking switch 213 and enables an operation control on the engine E by the controller 75 according to the conduction of the main switch 222.

The reception unit 227 is disposed in the luggage box 30 or in the rider's seat 31. In this embodiment, the luggage box 30 is provided with a reception unit containing portion 101f formed by recessing downwardly a part of a shallow bottom portion 110c of the luggage box 30. The reception unit 227 is contained in the reception unit containing portion 101f. Moreover, a first maintenance lid 117 for performing maintenance with regard to the engine E is disposed on the lower side of the luggage box 30 and is openably and closably provided at the shallow bottom portion 110c. The reception unit 227 is contained in the reception unit containing portion 101f so as to be covered with a part of the first maintenance lid 117.

Figure 20:
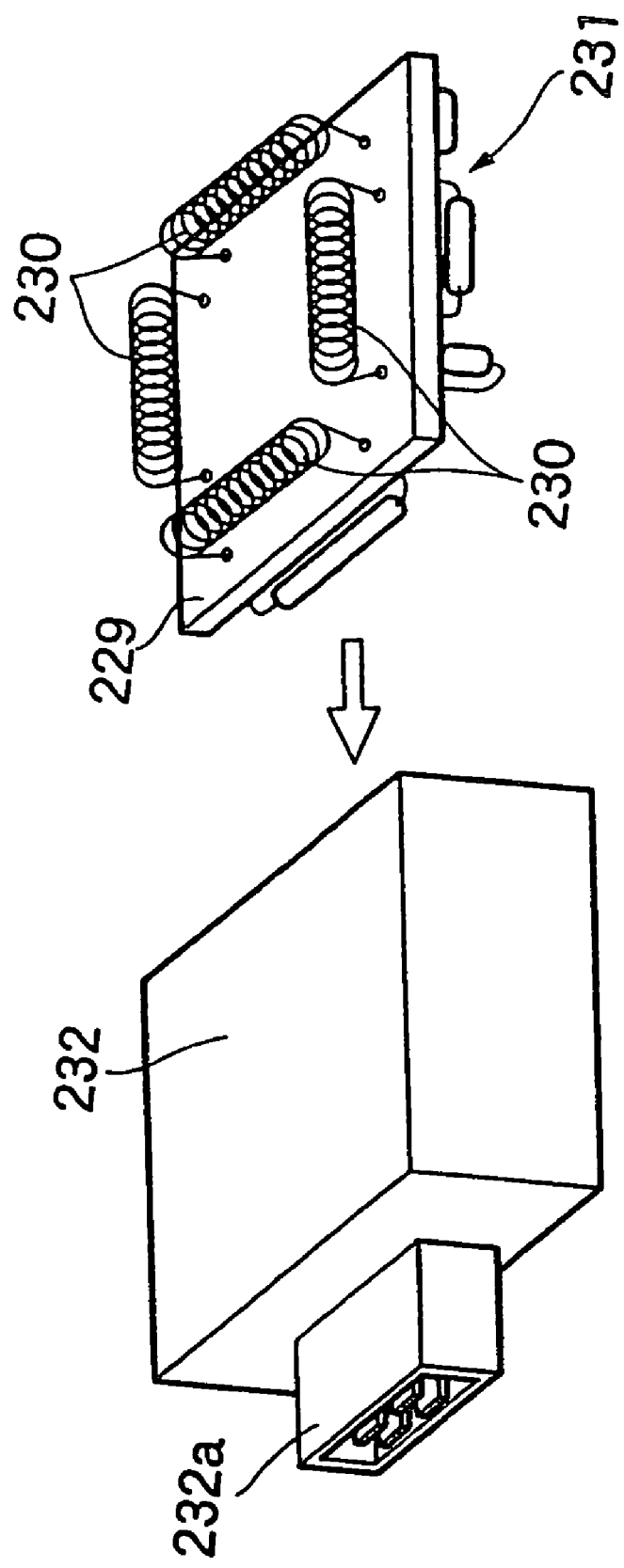
FIG. 20 is an exploded perspective view of a reception unit.

As illustrated in FIG. 20, the reception unit 227 has a structure in which a substrate 229 is provided with antennas 230, 230 on one side thereof and with a reception circuit 231 on the other side thereof and is contained in a case 232 integrally provided with a coupler portion 232a.

The transmission antenna 225 is disposed at a position spaced from the handle lock module 211. In this embodiment, the transmission antenna 225 is disposed on the upper side of the handle lock module 211 on the center line in the width direction of the vehicle, for example, directly under the panel 173 constituting a part of the vehicle body cover 34.

Figure 21:
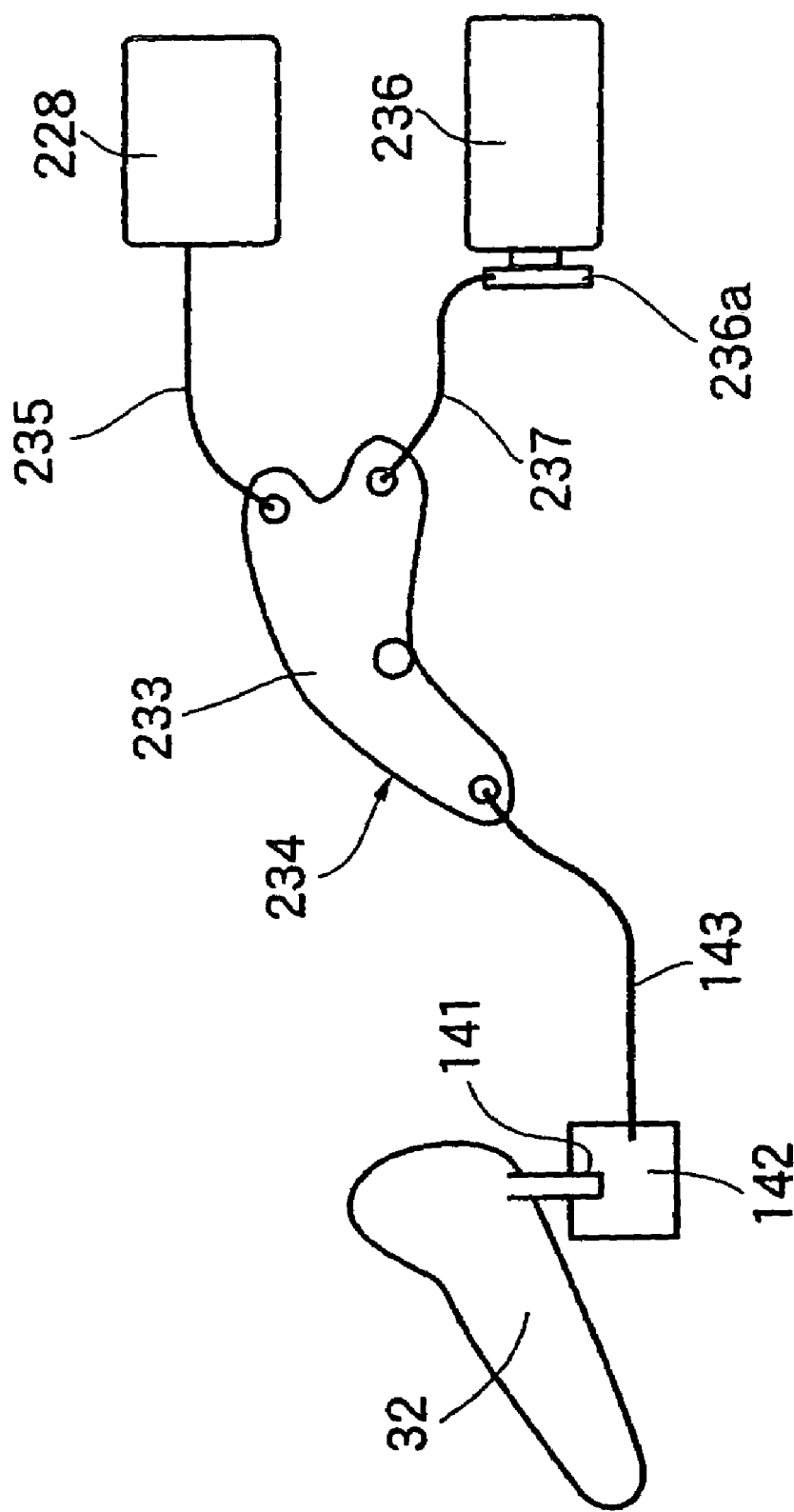
FIG. 21 is a view showing the general configuration of an emergency unlocking system for a seat lock.

As illustrated in FIG. 21, the power transmission cable 143 in connection with the seat catcher 142 and is connected to one end of a link 233 possessed by a link mechanism 234. The seat lock actuator 228 is connected to the other end of the link 233 through a cable 235 so that an operation of the seat lock actuator 228 turns the link 233 so as to pull the power transmission cable 143.

A key hole 238 of an emergency unlocking key cylinder lock 236 is disposed in the leg shield 158 so as to unnecessitate the portable transmitter 226 and to enable at least the starting of the engine E. The unlocking of the handle is disposed on the inside surface, on the handle lock module 211 side, of the containing recessed portion 214 of the second article containing portion 192.

The emergency unlocking key cylinder lock 236 includes a turnable lever 236a turned by operating an emergency unlocking mechanical key inserted in the key hole 238. The turnable lever 236a is connected to the other end side of the link 233 through a cable 237.

When the emergency unlocking key cylinder lock 236 is operated for unlocking, the link 233 is turned so as to pull the power transmission cable 143. By either one of the operation of the seat lock actuator 228 and the unlocking operation of the emergency unlocking key cylinder lock 236, the link 233 is turned so as to pull the power transmission cable 143, whereby the seat catcher 142 is changed over from the seat catch condition to the seat catch release condition.

When the front seat 32 is opened according to when the seat catcher 142 is set into the seat catch release condition and a predetermined component part disposed in the luggage box 30 is operated, the control unit 223 is set into the same control mode as that upon the reception of the ID signal from the normal portable transmitter 226, resulting in that the motor scooter type can be steered.

Now, the functions of this embodiment will be described. The rear projecting portion 12 projects to the rear side relative to the rear end of the rear seat 33. The support pipe 62 constituting the mount portion for mounting an upper portion of the rear shock absorber 64 to a rear portion of the vehicle body frame F is provided at a rear portion of the luggage box 30 which includes the front helmet containing portion 119 disposed on the lower side of the front seat 32 positioned by the tandem-type riders' seat 31. The rear helmet containing portion 120 is disposed on the rear seat 33 positioned by the riders' seat 31. Therefore, it is possible to contain in the luggage box 30 elongate things such as golf clubs extending rearwardly beyond the rear end of the riders' seat 31, and to increase the inside volume of the luggage box 30. Moreover, it is possible to contain small things other than the helmet in the rear portion of the luggage box 30, so that things not used frequently, such as tools, can be contained in the rear portion of the luggage box 30.

In addition, since the rear projecting portion 121 projects rearwardly to substantially the same position as the rear end of the grab rail 118 disposed around the rear seat 33, the inside volume of the luggage box 30 can be increased further and the rear portion of the luggage box 30 can be protected by the grab rail 118.

In addition, since the reduced width portion 121*a* coming into the gap between the left and right tail light units 123, 123 is provided at the rear portion of the rear projecting portion 121, the inside volume of the luggage box 30 can be increased by effectively utilizing the space generated between the left-right pair of tail light units 123. Thus, it becomes easier to form a space for the replacement of bulbs of the tail light units 123.

In addition, the luggage box 30 has the top cover 111 disposed on the lower side of the rear seat 33. The containing space 128 is utilizable according to the attachment and detachment of the rear seat 33 and is formed on the upper surface of the top cover 111. Therefore, another space for containing small things other than the inside of the luggage box 30 can be secured without increasing the number of component parts and without complexing the structure. In addition, the containing space 128 is formed in the first rib 127 erected on the top cover 111 and being endlessly continuous. The second rib 129 is endlessly continuous so as to form a labyrinth structure in cooperation with the first rib 127 projecting from the bottom plate 33*a* of the rear seat 33. Therefore, penetration of rainwater, dust or the like from the surroundings of the containing space 128 can be prevented by a simple structure.

In addition, since the illuminating tool 116 for illuminating the inside of the luggage box 30 is attached to the inside surface of the luggage box 30 at a portion corresponding to a front portion of the top cover 111, the inside of the rear portion of the luggage box 30 which is liable to be darkened by the presence of the top cover 111 can be effectively illuminated without being blocked by the things contained in the rear portion of the luggage box 30. In addition, at the portion corresponding to the front portion of the top cover 111, the inside surface of the luggage box 30 is easy to see, so that it is possible to easily confirm breakage of a bulb of the illuminating tool 116 or the like.

Further, since the rear upper cover 165 and the rear center cover 166 which cover the rear projecting portion 121, the left-right pair of tail light units 123 and the rear fender 181 are attached to the rear projecting portion 121. A plurality of members are disposed around the rear portion of the luggage box 30 that can be removed at a stroke by only removing the wirings for the tail light units 123, which provides for an excellent maintainability of the unit.

The luggage box 30 includes the shallow bottom portion 110*c* disposed between the front helmet containing portion 119 and the rear helmet containing portion 120. The throttle body 68 is annexed to the control box 76 containing the controller 75 therein and the fuel injection valve 74 are disposed on the lower side of the shallow bottom portion 110*c* with their top end positions being substantially the same. Therefore, by forming the shallow bottom portion 110*c* between the front and rear helmet containing portions 119 and 120 in a flat shape, it is possible to effectively utilize the shallow bottom portion 110*c* as an article containing portion, and to effectively dispose a part of an intake system of the engine E in the space on the lower side of the shallow bottom portion 110*c*.

The lower portion of the rear projecting portion 121 is disposed on the lower side relative to the mount portion for mounting an upper portion of the rear shock absorber 64 to a rear portion of the vehicle body frame F, in such a manner that the article containing portion 124 is located so as to be dispose, between itself and the rear helmet containing portion 120. The raised portion 110*d* formed by raising upwardly a part of the bottom wall of the luggage box 30 is formed in the rear projecting portion 121. The rear helmet containing portion 120 and the article containing portion 124 on the rear side relative to the rear helmet containing portion 120 are portioned from each other by the raised portion 110*d*, whereby a higher convenience in use can be contrived, and it is possible to prevent, by the raised portion 110*d*, the small things contained in the article containing portion 124 on the rear side from moving in the front-rear direction.

In addition, the fuel tank 28 formed to be elongate in the vertical direction in a side view is disposed on the front side of the luggage box 30. The front projecting portion 122 projects forward to the vicinity of the bottom portion of the fuel tank 28 and is provided at a lower portion of the front end of the luggage box 30. Therefore, it is possible to make the front portion of the luggage box 30 deep to thereby facilitate the containing of long things and to increase the inside volume of the luggage box 30.

In addition, since the battery 147 and other electrical equipments 148 to 150 are contained in the front projecting portion 122, the battery 147 and the electrical equipments 148 to 150 can be contained in the luggage box 30 in such a manner so as not to hamper the containing of the helmet H 1 and the like.

In addition, since the second maintenance lid 151 for partitioning the inside of the front projecting portion 122 and the front helmet containing portion 119 from each other is openably and closably attached to the luggage box 30, it is possible to prevent the things contained in the front projecting portion 122 and the helmet H1 contained in the front helmet containing portion 119 from being damaged through mutual contact.

Further, since a lower portion of the damper rod 152 that extends vertically so as to assist the opening and closing operations of the front seat 32 is contained in the front projecting portion 122, it is unnecessary to secure a space for disposing the damper rod 152 on the outside of the luggage box 30. Thus, the space may be minimized the possibility of exposure of the damper rod 152 to the exterior, while ensuring that putting things positioned in the luggage box 30 are not hampered when the front seat 32 is opened. In addition, the appearance properties are enhanced.

The fuel tank 28 and the radiator 29 are disposed on the lower side of the floor tunnel portion 167 formed by a part of the vehicle body cover 34 covering the vehicle body frame F. The vehicle body frame F includes the head pipe 27, the left-right pair of upper down frames 37 extending rearwardly and downwardly from the head pipe 27. The left-right pair of lower down frames 38 have the inclined portions 38*a* extending rearwardly and downwardly from the head pipe 27 on the lower side relative to the connection portions for connecting the head pipe 27 to the upper down frames 37. The fuel tank 28 extends vertically over the range from the rear side of a lower portion of the head pipe 27 to lower portions of both the lower down frames 38 and is disposed in the space which is surrounded by both the upper down frames 37 and both the lower down frames 38 and which is located immediately on the rear side of the front wheel WF.

Therefore, by disposing the vertically long fuel tank 28 immediately on the rear side of the front wheel WF, it is possible to prevent the portion corresponding to the lower portion of the head pipe 27 from becoming a dead space and to arrange component parts while effectively utilizing the space on the lower side of the floor tunnel portion 167. Moreover, since the fuel tank 28 having a comparatively large weight is disposed close to the front wheel WF, it is possible to enhance the distributed load of the front wheel WF and to contrive a higher turning performance. In addition, since the vertically long fuel tank 28 can be made to have a comparatively large residual amount of height in the condition where the residual fuel amount is small, it is advantageous to provide the suction of the pump where the pump unit 97 is annexed to the fuel tank 28, as in this embodiment.

Further, since the radiator 29 is disposed on the rear side of the fuel tank 28 and the battery 147 is disposed between the radiator 29 and the fuel tank 28, the space on the rear side of the fuel tank 28 can be set comparatively broad by making the fuel tank 28 vertically long. The arrangement of the battery, which is a heavy component, at the center in the front-rear direction of the vehicle body can contribute to the enhancement of the drivability. In addition, by disposing the battery 147 between the heat-radiating radiator 29 and the fuel tank 28, it is possible to prevent the effect of the heat coming from the radiator 29 from being exerted on the fuel tank 28.

Since the pump unit 97 is contained and disposed in a lower portion of the inside of the fuel tank 28 and is attached to the fuel tank 28 from the back side of the fuel tank 28, the pump unit 97 can be attached to the fuel tank 28 so as not to be influenced by steps present in the road surface.

Moreover, since the pump unit 97 is attached to the fuel tank 28 with its rotational axis inclined forwardly and downwardly, it is possible to set the suction port of the pump unit 97 closer to the bottom portion of the fuel tank 28. Thus, the dead residual amount of the fuel in the fuel tank 28 is minimize.

In addition, the reservoir tank 104 of the radiator 29 is disposed on the lower side of the step floor 159 constituting a part of the vehicle body cover 34. The water supply port of the reservoir tank 104 is disposed on the lower side of the first maintenance lid 117 detachably attached to the bottom wall of the luggage box 30 disposed on the lower side of the drivers' seat 31. Therefore, with the radiator 29 disposed on the rear side of the fuel tank 28 and the water supply port 107 of the radiator 104 can be easily made to front on the bottom portion of the drivers' seat 31. Thus, it is possible to dispose the water supply port 107 to be higher than in the case where the water supply port fronts on the step floor 159 located immediately above the reservoir tank 104 or the like. Therefore, it is possible to obtain a good water supply workability.

Moreover, since the water supply port forming member 108 for forming the water supply port 107 is supported on the mount portion 54, for mounting onto the vehicle body frame F side, of the tension rod 53 provided between the vehicle body frame F and the unit swing engine UE swingably borne on the vehicle body frame F, it is possible to support the water supply port forming member 108 by the vehicle body frame F, without the need to apply a special contrivance for supporting the water supply port forming member 108.

Further, the fuel from the fuel tank 28 is supplied to the fuel injection valve 74 and the fuel in the fuel tank 28 can be effectively supplied to the fuel injection valve 74 by use of the pump unit 97 annexed to the fuel tank 28 which sets the residual amount height to be comparatively high in the condition where the residual fuel amount is small.

The swing arm 48 disposed on the right side of the rear wheel WR and supporting the rear wheel WR is formed in a roughly triangular shape in side view, and the brake caliper 85 of the rear brake 84 is supported by the swing arm 48. In this case, since the opening portion 81 is provided in a roughly central portion of the swing arm 48 and the brake caliper 85 is disposed in the opening portion 81, it is possible to dispose the brake caliper 85 at a comparatively low position and to thereby contrive a lowering of the center of gravity of the motor scooter type vehicle. In addition, since the periphery of the brake caliper 85 is surrounded by the swing arm 48, it is possible to secure a substantial width in the vertical direction of the swing arm 48 in a side view, and thereby to enhance the vertical and torsional rigidities.

In addition, since the exhaust muffler 78 is disposed on the outer side of the swing arm 48 so as to cover the brake caliper 85 from the outer side, the appearance quality can be enhanced.

Further, the opening portion 81 is so formed that its vertical width decreases as one goes rearwardly and the brake caliper 85 disposed in a rear portion of the opening portion 81 is supported by the swing arm 48 on the rear side relative to the opening portion 81. Thus, the mount rigidity of the brake caliper 85 can be enhanced by supporting the brake caliper 85 by a higher rigidity portion of the swing arm 48.

Further, a lower portion of the exhaust muffler 78 is fastened to the swing arm 48 at two locations on both the front and rear sides of the axle 80 of the rear wheel WR. The axle 80 and the fastening portion, for fastening to the swing arm 48, of the rear shock absorber 64 provided between the swing arm 48 and the vehicle body frame F are disposed between the straight line L connecting between the fastening portions of the lower portion of the exhaust muffler 78 and the exhaust muffler 78. Therefore, it is possible to facilitate the mounting of the exhaust muffler 78 and the rear shock absorber 64 onto the swing arm 48, to render the axle 80 and the fastening portions difficult to see from above the side surfaces of the motor scooter type vehicle, and thereby to enhance appearance quality.

The electric motor 42 for changing the speed change ratio of the non-stage transmission M interposed between the engine E and the rear wheel WR is disposed on the lower side of the passenger step 162 provided at a rear portion of the step floor 159 possessed by the vehicle body cover 34. The arrangement of the electric motor 42 at a comparatively low position can contribute to a lowering of the center of gravity of the motor scooter type vehicle.

In addition, the non-stage transmission M is of the belt type which constitutes the unit swing engine UE together with the engine E having the axis of the cylinder 45 set substantially horizontal. The electric motor 42 is disposed on the front side of the non-stage transmission M and on a lateral side of the cylinder 45. Therefore, the electric motor 42 can be protected by the cylinder 45 of the engine E and the non-stage transmission M. Moreover, since the vehicle body frame F is provided with the support frame 41 for supporting the step floor 159 from the lower side and the electric motor 42 is disposed on the lower side of the support frame 41, the electric motor 42 can be protective more effectively by the support frame 41 which is high in rigidity.

Further, since the electric motor 42 is disposed with its rotational axis directed in the vehicle width direction, the electric motor 42 can be disposed on a lateral side of the cylinder 45 possessed by the engine E so that it does not project to the outer side from the outside surface of the non-stage transmission M.

The grab rail 118 is attached to a rear portion of the vehicle body frame F. The back rest 135, which is formed in a roughly streamline shape having, at its upper surface, the front inclined surface 135a inclined forwardly and downwardly in a side view and the rear inclined surface 135b inclined rearwardly and downwardly in a side view and which is attached to the upper surface of a rear portion of the grab rail 118 is disposed on the rear side of the rear seat 33.

Therefore, a waist portion of the passenger on the rear seat 33 can be securely held by the front inclined surface 135a inclined forwardly and downwardly, of the upper surface of the back rest 135. The roughly streamline shape in a side view makes it possible to enhance the appearance quality of the back rest 135 and to contrive a higher aerodynamic performance. In addition, since it is possible to make the most of the rear inclined surface 135b inclined rearwardly and downwardly, of the upper surface of the back rest 135, luggage projecting rearwardly from the rear seat 33 can be mounted on the back rest 135.

In addition, since the back rest 135 is formed so that its width gradually decreases as one goes rearwardly in a top plan view, it is possible to make the back rest 135 in a compact form, which, in cooperation with the shape of the vehicle body cover 34, makes it possible to secure harmony on a design basis and to further enhance the aerodynamic performance.

Further, since the upper surface of a rear portion of the grab rail 118 is set at substantially the same height as the upper surface of the rear seat 33 and the back rest 135 is detachably attached to the upper surface of the rear portion of the grab rail 118, it is possible to mount luggage by effectively utilizing the upper surface of the rear portion of the grab rail 118 upon removal of the back rest 135 when it is desired to mount more luggage on the rear seat 33.

The first article containing portion 191 is configured as a drawer type having the containing case 193 capable of being removed by the drawing out of the leg shield 158 positioned by the vehicle body cover 34. The second article containing portion 192, in which the containing recessed portion 214 is formed in the leg shield 158, is openably and closably covered with the lid member 215 hinged to the leg shield 158. The first article containing portion 191 and the second article containing portion 192 are disposed in the leg shield 158 in a state of being divided into left and right portions. Thus, it is possible to contain articles in the leg shield 158 while effectively utilizing the comparatively broad space in the leg shield 158. Moreover, since the containing case 193 is formed to be larger than the containing recessed portion 214, a comparatively large amount of articles can be contained in the first article containing portion 191. In this case, the drawer type configuration ensures that the articles in the inside of the containing case 193 will not go out when the lid is opened and that articles can be contained in such a manner so as to fill up the inside of the containing case 193. In addition, when the containing case 193 is removed from the leg shield 158, a comparatively large opening portion 196 can be formed in the leg shield 158, whereby it is possible to easily perform maintenance of the bulb 171a of the head light 171 disposed on the front side relative to the first article containing portion 191, or the like.

In addition, the locking mechanism 208 capable of a changeover between the connection of the containing case 193 of the first article containing portion 191 to the leg shield 158 and a release of the connection, according to key operations via the key hole 207 fronting on the front surface of the containing case 193, is provided between the containing case 193 and the leg shield 158. The containing case 193 can be drawn out by inserting a key into the key hole 207 of the locking mechanism 208 and operating the key. Therefore, it is possible to prevent the articles contained in the first article containing portion 191 from being stolen. In addition, since the containing case 193 can be drawn out by using the key as a handle, it is unnecessary to provide the containing case 193 with a handle and to contain more articles in the first article containing portion 191.

Further, since the containing case 193 is formed so as to cover the head pipe 27 from one of the left and right sides when in its stored state and the locking mechanism 208 is opposed to the head pipe 27 from the rear side of the latter, the containing capacity of the containing case 193 can be set larger by effectively disposing the locking mechanism 208 in the space on the rear side of the head pipe 27.

Further, the handle lock module 211 is capable of disabling the steering operation of the steering handle 26 and is disposed on the opposite side of the first article containing portion 191 and in the vicinity of the head pipe 27. The second article containing portion 192 is so disposed that the handle lock module 211 is interposed between the first article containing portion 191 and the second article containing portion 192. Therefore, by the arrangement in which the first article containing portion 191, the handle lock module 211 and the second article containing portion 192 are arranged side by side in the leg shield 158, it is possible to more effectively utilize the comparatively broad space in the leg shield 158.

In addition, since the transmission antenna 225 is disposed at a position spaced from the handle lock module 211, it is possible to enhance the degree of freedom in arranging the transmission antenna 225.

In addition, since the reception unit 227 is disposed in the luggage box 30 or in the riders' seat 31, it is disposed in the luggage box 30 in this embodiment, the environmental resistance properties of the reception unit 227 concerning mud, dust, water, external forces and the like can be secured, without the need to cover the reception unit 227 with a cover member made of a synthetic resin. Therefore, it is possible to secure a waterproof reception unit 227 while not necessitating readjustment of the reception unit 227.

Further, the reception unit 227 has a structure in which the substrate 229 is provided with the antannas 230, 230 on one side thereof and with the reception unit 231 on the other side thereof being contained in the case 232. Thus, it is possible to configure the reception unit 227 in a compact form and to minimize the space required for laying out the reception unit 227 in the luggage box 30.

Further, the first maintenance lid 117 for performing maintenance concerning the engine E is disposed on the lower side of the luggage box 30 and is openably and closably provided at the bottom wall of the luggage box 30. The reception unit 227 is disposed in the luggage box 30 so as to be covered with a part of the first maintenance lid 117. Therefore, the reception unit 227 can be disposed at a position suitable for performing maintenance, while preventing interference with the articles contained in the luggage box 30.

In addition, the emergency unlocking key cylinder lock 236 is provided for enabling at least the starting of the engine E and the unlocking of the steering handle while eliminating the need for the portable transmitter 226. The emergency unlocking key cylinder lock 236 is disposed in the leg shield 158. Therefore, even when the vehicle user has lost the portable transmitter 226 or when the life of the battery in the portable transmitter 226 has expired, the motor scooter type vehicle can be run by operating the emergency unlocking key cylinder lock 236 by use of a mechanical key for emergency unlocking.

In addition, the leg shield 158 is provided with the second article containing portion 192 on the right side of the handle lock module 211. The key hole 238 of the emergency unlocking key cylinder lock 236 fronts on the inside surface of the containing recessed portion 214 of the second article containing portion 192 and the containing recessed portion 214 is normally closed with the lid member 215. Therefore, the key hole 238 can be disposed at such a place as not to be conspicuous. Thus, it is possible to minimize the possibility of mischief on the key hole 238 of the emergency unlocking key cylinder lock 236.

Further, the link mechanism 234 connected to the seat catcher 142 for performing a changeover between the seat catch condition where the front seat 32 is capable of opening the luggage box 30 is held in a closed state. The seat catch release condition where the opening and closing operations of the front seat 32 are possible is connected to the seat lock actuator 228 operated according to the operation upon reception of a signal from the normal portable transmitter 226 and is connected to the emergency unlocking key cylinder lock 236. Therefore, the link mechanism 234 for operating the seat catcher 142 can be used in common in the case where the portable transmitter 226 is valid and in the case where the emergency unlocking key cylinder lock 236 is used, whereby the number of component parts can be reduced.

While one embodiment of the present invention has been described above, the present invention is not limited to the above embodiment, and various design modifications are possible without departure from the present invention as set forth in the claims.

For example, the present invention is applicable also to motorcycles other than the motor scooter type vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake caliper support structure for a motorcycle comprising:
    a swing arm disposed on one side of a rear wheel and supporting said rear wheel, said swing arm being roughly triangular in shape in a side view; and
    a brake caliper of a rear brake, said brake caliper being supported by said swing arm;
    wherein an opening portion is provided in a roughly central portion of said swing arm and said brake caliper is disposed in and completely surrounded by said opening portion.

2. The brake caliper support structure for a motorcycle as set forth in claim 1, wherein an exhaust muffler is disposed on an outer side of said swing arm so as to cover said brake caliper from the outer side.

3. The brake caliper support structure for a motorcycle as set forth in claim 2, wherein a lower portion of said exhaust muffler is fastened to said swing arm at two positions on both the front and rear sides of an axle of said rear wheel, and wherein a fastening portion, for fastening said swing arm to a rear shock absorber provided between said swing arm and a vehicle body frame, is disposed along a straight line connecting said fastening portions of said lower portion of said exhaust muffler.

4. The brake caliper support structure for a motorcycle as set forth in claim 1, wherein said opening portion is formed wherein a vertical width decreases rearwardly and the brake caliper disposed in a rear portion of said opening portion is supported by the swing arm on the rear side relative to the opening portion.

5. The brake caliper support structure for a motorcycle as set forth in claim 1, and further including a shock absorber, said shock absorber having a proximal end connected to a rear end of the swing arm and a distal end connected to a frame of the motorcycle.

6. The brake caliper support structure for a motorcycle as set forth in claim 1, and further including a brake caliper bracket, said brake caliper being fixed to the brake caliper bracket with the brake caliper bracket being mounted to a rearward portion of said opening.

7. The brake caliper support structure for a motorcycle as set forth in claim 1, and further including a drum brake attached to the rear wheel with a lever for actuating the drum brake being disposed on an outside of the swing arm.

8. A brake caliper support structure adapted for use with a motorcycle comprising:
    a swing arm adapted to be disposed on one side of a rear wheel for supporting said rear wheel, said swing arm being of an extended shape with three sidewalls formed at an angle relative to each other in a side view; and
    a brake caliper operatively connected to a rear brake, said brake caliper being supported by said swing arm;
    wherein an opening portion is provided in substantially a central portion of said swing arm and said brake caliper is disposed in and completely surrounded by said opening portion.

9. The brake caliper support structure adapted for use with a motorcycle as set forth in claim 8, wherein an exhaust muffler is disposed on an outer side of said swing arm so as to cover said brake caliper from the outer side.

10. The brake caliper support structure adapted for use with a motorcycle as set forth in claim 9, wherein a lower portion of said exhaust muffler is fastened to said swing arm at two positions on both the front and rear sides of an axle of said rear wheel, and wherein a fastening portion, for fastening said swing arm to a rear shock absorber provided between said swing arm and a vehicle body frame, is disposed along a straight line connecting said fastening portions of said lower portion of said exhaust muffler.

11. The brake caliper support structure adapted for use with a motorcycle as set forth in claim 8, wherein said opening portion is formed wherein a vertical width decreases rearwardly and the brake caliper disposed in a rear portion of said opening portion is supported by the swing arm on the rear side relative to the opening portion.

12. The brake caliper support structure adapted for use with a motorcycle as set forth in claim 8, and further including a shock absorber, said shock absorber having a proximal end connected to a rear end of the swing arm and a distal end connected to a frame of the motorcycle.

13. The brake caliper support structure adapted for use with a motorcycle as set forth in claim 8, and further including a brake caliper bracket, said brake caliper being fixed to the brake caliper bracket with the brake caliper bracket being mounted to a rearward portion of said opening.

14. The brake caliper support structure adapted for use with a motorcycle as set forth in claim 8, and further including a drum brake attached to the rear wheel with a lever for actuating the drum brake being disposed on an outside of the swing arm.

15. A brake caliper support structure for a vehicle comprising:
   a vehicle frame;
   a swing arm operatively mounted relative to said vehicle frame, said swing arm being disposed on one side of a rear wheel for supporting said rear wheel and said swing arm being of an extended shape with three sidewalls formed at an angle relative to each other in a side view; and
   a brake caliper operatively connected to a rear brake, said brake caliper being supported by said swing arm;
   wherein an opening portion is provided in substantially a central portion of said swing arm and said brake caliper is disposed in and completely surrounded by said opening portion.

16. The brake caliper support structure for a vehicle as set forth in claim 15, wherein an exhaust muffler is disposed m so as to cover said brake caliper from the outer side.

17. The brake caliper support structure for a vehicle as set forth in claim 16, wherein a lower portion of said exhaust muffler is fastened to said swing arm at two positions on both the front and rear sides of an axle of said rear wheel, and wherein a fastening portion, for fastening said swing arm to a rear shock absorber provided between said swing arm and a vehicle body frame, is disposed along a straight line connecting said fastening portions of said lower portion of said exhaust muffler.

18. The brake caliper support structure for a vehicle as set forth in claim 15, wherein said opening portion is formed wherein a vertical width decreases rearwardly and the brake caliper disposed in a rear portion of said opening portion is supported by the swing arm on the rear side relative to the opening portion.

19. The brake caliper support structure for a vehicle as set forth in claim 15, and further including a shock absorber, said shock absorber having a proximal end connected to a rear end of the swing arm and a distal end connected to a frame of the motorcycle.

20. The brake caliper support structure for a vehicle as set forth in claim 15, and further including a brake caliper bracket, said brake caliper being fixed to the brake caliper bracket with the brake caliper bracket being mounted to a rearward portion of said opening.

* * * * *